(12) United States Patent (10) Patent No.: US 9,639,823 B2
Park et al. (45) Date of Patent: May 2, 2017

(54) ELECTRIC PRODUCT

(71) Applicant: LG ELECTRONICS INC., Seoul (KR)

(72) Inventors: Hyoungjun Park, Changwon-si (KR); Jongmi Choi, Changwon-si (KR); Museung Kim, Changwon-si (KR); Yanghwan Kim, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 668 days.

(21) Appl. No.: 14/040,176

(22) Filed: Sep. 27, 2013

(65) Prior Publication Data

US 2014/0169640 A1 Jun. 19, 2014

(30) Foreign Application Priority Data

Sep. 28, 2012 (KR) .................. 10-2012-0108660
Jan. 2, 2013 (KR) .................. 10-2013-0000086
Jan. 2, 2013 (KR) .................. 10-2013-0000087

(51) Int. Cl.
*G06Q 10/00* (2012.01)
*G06Q 10/08* (2012.01)
*G06F 7/06* (2006.01)
*F25D 29/00* (2006.01)

(52) U.S. Cl.
CPC .......... *G06Q 10/087* (2013.01); *F25D 29/00* (2013.01); *G06F 7/06* (2013.01); *F25D 2400/361* (2013.01); *F25D 2500/06* (2013.01)

(58) Field of Classification Search
CPC ............. F25D 29/00; F25D 2400/361; F25D 2500/06; G06F 7/06; G06Q 10/087
See application file for complete search history.

(56) References Cited

U.S. PATENT DOCUMENTS 5,711,160 A * 1/1998 Namisniak ............... G09F 9/00
116/308
5,969,606 A * 10/1999 Reber ..................... B65D 77/24
340/540
6,131,812 A * 10/2000 Schneider ............. G01G 19/56
235/375
6,189,781 B1 * 2/2001 Yoshinaga ........... G07G 1/0045
235/375

(Continued)

FOREIGN PATENT DOCUMENTS

CN 1330331 A 1/2002
CN 101776367 A 7/2010
(Continued)

*Primary Examiner* — Manav Seth
(74) *Attorney, Agent, or Firm* — Dentons US LLP

(57) ABSTRACT

An electric product which includes a recognition device obtaining information about a food item to be added to a storage compartment, and a display unit displaying information about a food item stored in the storage compartment. The electric product further includes a memory unit storing the information about the food item stored in the storage compartment, and a control unit controlling the display unit. The recognition device obtains information about a food item to be added. The control unit stores the information about the food to be added in the memory unit and displays the information about the food added to the memory unit on the display unit.

30 Claims, 30 Drawing Sheets

(56) References Cited

U.S. PATENT DOCUMENTS

| | | | | |
|---|---|---|---|---|
| 6,269,285 B1* | 7/2001 | Mignault | ............... | A47F 1/06 206/745 |
| 6,393,848 B2* | 5/2002 | Roh | ............... | F25D 29/00 236/51 |
| 6,502,411 B2* | 1/2003 | Okamoto | ............... | F25B 49/00 236/51 |
| 6,675,591 B2* | 1/2004 | Singh | ............... | A23G 9/00 236/51 |
| 6,889,510 B2* | 5/2005 | Song | ............... | G06F 8/65 236/51 |
| 6,950,095 B2* | 9/2005 | Kim | ............... | F25D 29/00 345/173 |
| 6,982,640 B2* | 1/2006 | Lindsay | ............... | G06K 19/0717 340/10.1 |
| 7,096,221 B2* | 8/2006 | Nakano | ............... | G06F 19/3475 235/375 |
| 7,132,926 B2* | 11/2006 | Vaseloff | ............... | G06Q 10/087 235/385 |
| 7,292,146 B1* | 11/2007 | Nguyen | ............... | F25D 29/00 340/3.1 |
| 7,861,542 B2* | 1/2011 | Rozendaal | ............... | F25D 29/00 236/54 |
| 7,925,976 B2* | 4/2011 | Shin | ............... | F25D 29/00 236/94 |
| 7,973,642 B2* | 7/2011 | Schackmuth | ............... | G06Q 10/06 340/10.51 |
| 8,371,135 B2* | 2/2013 | Lee | ............... | F25D 29/00 62/127 |
| 8,577,759 B2* | 11/2013 | Solomon | ............... | B65G 1/127 705/28 |
| 8,606,649 B2* | 12/2013 | Keener, Jr. | ............... | G06Q 30/02 705/26.1 |
| 8,797,327 B2* | 8/2014 | Finn | ............... | G06T 13/20 345/156 |
| 9,013,273 B2* | 4/2015 | Oh | ............... | F25D 29/00 340/6.1 |
| 9,111,440 B2* | 8/2015 | Park | ............... | G08C 17/02 |
| 2002/0016739 A1* | 2/2002 | Ogasawara | ............... | G06K 17/00 705/22 |
| 2002/0066279 A1* | 6/2002 | Kiyomatsu | ............... | F25D 29/00 62/125 |
| 2003/0069859 A1* | 4/2003 | Hoffman | ............... | G06Q 10/06 705/400 |
| 2003/0103023 A1* | 6/2003 | Ootsuka | ............... | F25D 29/005 345/87 |
| 2003/0164754 A1* | 9/2003 | Roseen | ............... | F25D 25/00 340/309.16 |
| 2004/0035123 A1* | 2/2004 | Kim | ............... | F25D 29/00 62/127 |
| 2004/0085225 A1* | 5/2004 | Wilson | ............... | B42D 15/0053 340/870.16 |
| 2006/0174641 A1* | 8/2006 | Liu | ............... | F25D 29/00 62/246 |
| 2008/0195944 A1* | 8/2008 | Lee | ............... | F25D 29/00 715/706 |
| 2010/0283573 A1* | 11/2010 | Yum | ............... | F25D 29/00 340/3.1 |
| 2011/0264286 A1* | 10/2011 | Park | ............... | G06Q 10/00 700/286 |
| 2012/0101876 A1* | 4/2012 | Turvey | ............... | G06Q 30/02 705/14.1 |
| 2013/0067375 A1* | 3/2013 | Kim | ............... | F25D 29/00 715/769 |

FOREIGN PATENT DOCUMENTS

| | | |
|---|---|---|
| CN | 102538379 A | 7/2012 |
| CN | 102589247 A | 7/2012 |
| KR | 10-2006-0125016 A | 12/2006 |
| KR | 10-1036405 B1 | 5/2011 |

* cited by examiner

Fig.20

PUT RECEIPT WITHIN SCREEN GUIDE

| PRODUCT CODE | UNIT PRICE | QUANTITY | SUM |
|---|---|---|---|
| 001  HITE CAN 50ML | | | |
| *8801119834201 | 1,720 | 1 | 1,720 |
| 002  OH LATTE APPLE 340ml | | | |
| *860109218024 | 890 | 1 | 890 |
| 003  GERMINATED TEA 500ml | | | |
| *8806002005901 | 990 | 1 | 990 |
| 004  ORANC ORANGE 500 | | | |
| *8801097234413 | 980 | 1 | 980 |
| 005  MAXIM TOP DOUBLE RACK 275ML | | | |
| *8801037087741 | 1,770 | 1 | 1,770 |
| 006  MAXCAN BEER 500ML | | | |
| *8801119264206 | 1,720 | 1 | 1,720 |
| 007  TROPICANA STRAWBERRY LATTE 350 | | | |
| *8801056034610 | 670 | 1 | 670 |
| 008  BUSAN MILK 1000ML | | | |
| *8801526132044 | 2,150 | 1 | 2,150 |
| 009  CAS FRESH CAN 500ML | | | |
| *8801858011024 | 1,720 | 1 | 1,720 |
| 010  NEW DAY SODA APPLE 410ml | | | |
| *8801097261310 | 640 | 1 | 640 |

COMPLETE    CANCEL

ELECTRIC PRODUCT

CROSS-REFERENCE TO RELATED APPLICATIONS

The present application claims priority under 35 U.S.C. 119 and 35 U.S.C. 365 to Korean Patent Application No. 10-2012-0108660 (filed on Sep. 28, 2012), Korean Patent Application No. 10-2013-0000086 (filed on Jan. 2, 2013), and Korean Patent Application No. 10-2013-0000087 (filed on Jan. 2, 2013), each of which is hereby incorporated by reference in its entirety.

BACKGROUND

The present disclosure relates to an electric product.

A refrigerator, as one example of an electric product, is a device for keeping food in a low temperature state. The refrigerator may include one of a freezer and a fridge.

Related art refrigerators, only provide a function for keeping food in a low temperature state. Recently, however, in addition to a food storage function, the trend is towards additional functionality.

SUMMARY

This disclosure describes embodiments of an electric product.

In one embodiment, an electric product includes: a recognition device obtaining information about a food item to be added to a storage compartment; a display unit displaying information about a food item stored in the storage compartment; a memory unit storing the information about the food stored in the storage compartment; and a control unit controlling the display unit, wherein when the recognition device obtains information about the food item to be added, the control unit stores the information about the food item to be added in the memory unit and displays the information about the food added to the memory unit on the display unit.

In another embodiment, an electric product includes: a display unit displaying information about a food item stored in a storage compartment; a memory unit storing information about the food item stored in the storage compartment; a control unit controlling the display unit; and a communication unit in communication with an external terminal, wherein when the communication unit receives information related to a food item to be added from the external terminal, the control unit stores the received information about food item to be added in the memory unit, and the control unit displays the information about the added food item stored in the memory unit on the display unit.

In still another embodiment, an electric product includes: a recognition device obtaining information about a food item to be added to a storage compartment; a display unit displaying information about a food item stored in the storage compartment; a memory unit storing the information about the food item stored in the storage compartment; and a control unit controlling the display unit, wherein the recognition device obtains an image of a recognition target; and the control unit extracts a recognition target area from the obtained image to display the extracted recognition target area on the display unit, determines a recognition target area where a recognition is performed among the displayed recognition target area, and recognizes information in the determined recognition target area to display a recognition result on the display unit.

In yet another embodiment, an electric product includes: a main body including a storage compartment; a door opening/closing the storage compartment; a detection unit detecting the opening/closing of the door; a display unit, located at the main body or the door, to display information; and a control unit controlling the display unit on the basis of information detected from the detection unit, wherein a screen displayed on the display unit comprises a main screen and a function management screen displayed when an external command is inputted while the main screen is displayed, and when the detection unit detects the opening/closing of the door, the control unit displays the function management screen on the display unit.

The details of one or more embodiments are set forth in the accompanying drawings and the description below. Other features will be apparent from the description and drawings, and from the claims.

BRIEF DESCRIPTION OF THE DRAWINGS

FIGS. 18 to 22 are views illustrating screens displayed on a display unit of a refrigerator according to one embodiment of the present invention.

DETAILED DESCRIPTION

Reference will now be made in detail to the embodiments of the present disclosure, examples of which are illustrated in the accompanying drawings.

In the following detailed description of the preferred embodiments, reference is made to the accompanying drawings in which is shown by way of illustration specific preferred embodiments in which embodiments of the invention may be practiced. These embodiments are described in sufficient detail to enable those skilled in the art to practice the invention, and it is understood that other embodiments may be utilized. Logical, structural, mechanical, electrical, and chemical changes may be made without departing from the spirit or scope of the invention. To avoid details not necessary to enable those skilled in the art to practice the invention, the description may omit certain information known to those skilled in the art. The following detailed description is, therefore, not to be taken in a limiting sense.

Figure 1:
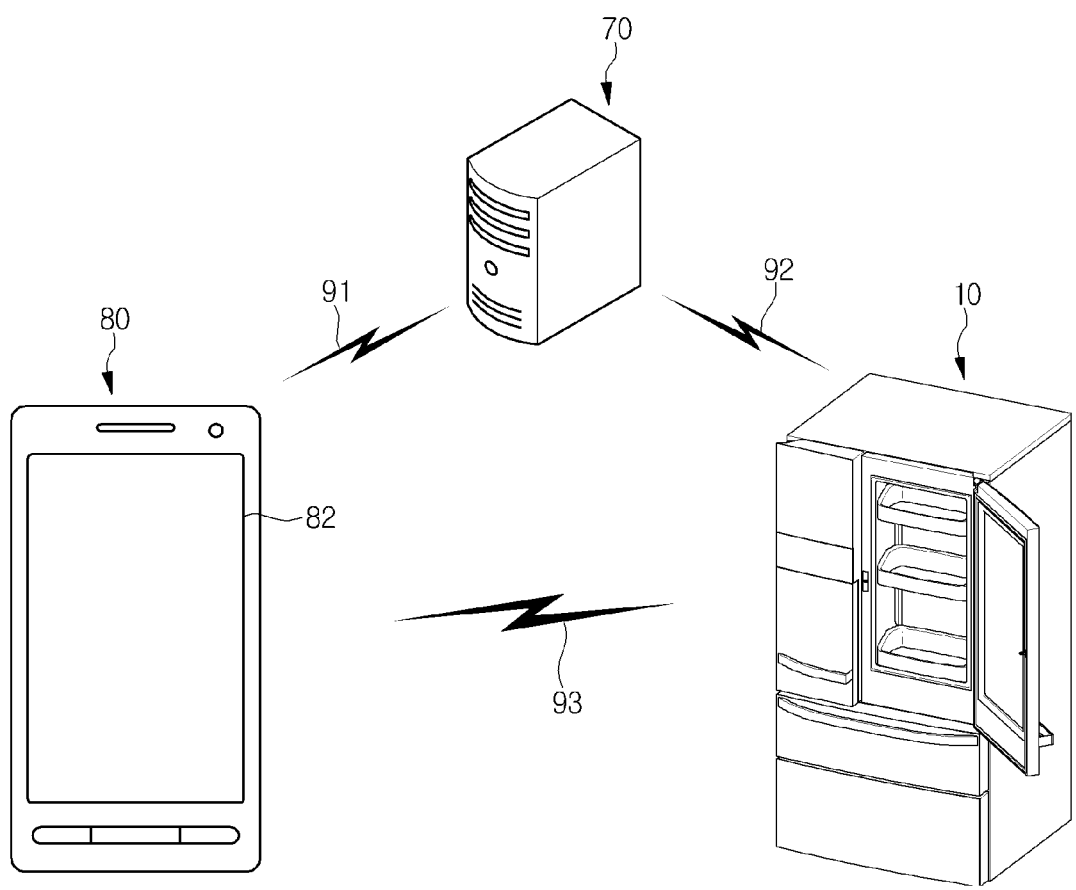
FIG. 1 is a view illustrating a configuration of a network system according to an embodiment of the present invention.
Figure 2:
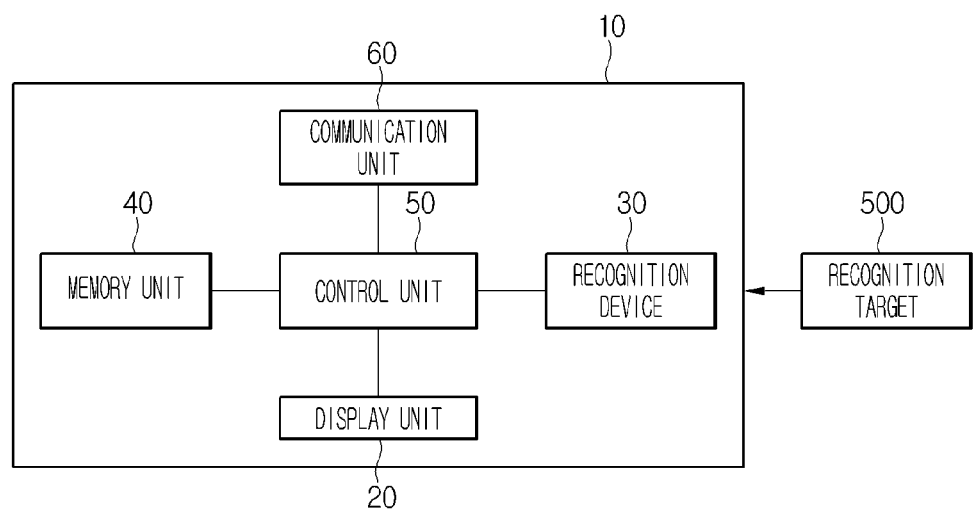
FIG. 2 is a block diagram of a refrigerator configuring the network system according to one embodiment of the present invention.

FIG. 1 is a view illustrating a configuration of a network system according to an embodiment of the present invention. FIG. 2 is a block diagram of a refrigerator within the network system configuration of FIG. 1 according to one embodiment of the present invention.

Referring to FIGS. 1 and 2, the network system includes a refrigerator 10 generating cold air and storing a target (i.e., product or item) as one example of an electric product, a terminal 80 connected for communication with the refrigerator 10, and a server 70 connected to the refrigerator 10 and the terminal 80 for communication and storing predetermined data.

The terminal 80 includes a display unit 82 displaying predetermined information. Product information stored in the refrigerator 10 or operating state information of the refrigerator 10 may be displayed on the display unit 82. That is, the terminal 80 may monitor a state of the refrigerator 10. Additionally, the terminal 80 may control an operation of the refrigerator 10. Information recognized by the terminal 80 may be transmitted to the refrigerator 10.

The terminal 80 may be, for example, a portable mobile phone or a smart phone but is not limited thereto.

The network system may include a first interface 91 for communication between the terminal 80 and the server 70, a second interface 92 for communication between the server 70 and the refrigerator 10, and a third interface 93 for communication between the terminal 80 and the refrigerator 10.

At least one communication type of WiFi, Zig-bee, Bluetooth, and internet may be applied as a communication type for delivering information among the first, second, and third interfaces 91, 92, and 93. However, these are example communication types and there is no limit in a communication type that is contemplated by the present disclosure.

The refrigerator 10 may include a display unit 20 for displaying information, a recognition device 30 for recognizing information, a memory unit 40 for storing product related information, and a communication unit 60 for communicating with the server 70 or the terminal 80.

The recognition device 30 may include at least one of a camera, an RFID reader, a QR code reader, a barcode reader, and a scanner. Hereinafter, the case that the recognition device 30 is a camera is described.

The recognition device 30 may obtain an image of a recognition target 500. The recognition target 500 may, for example, be a purchase receipt of a product.

Also, product related information in the recognition target 500 may be extracted from an image obtained by the recognition device 30. A technique for recognizing product related information from the recognition device 30 will be described later with reference to the drawings.

The product related information may be stored in the memory unit 40. Some or all of the information stored in the memory unit 40 may be stored in the server 70 or the terminal 80, or may be loaded from the server 70 or the terminal 80.

Figure 3:
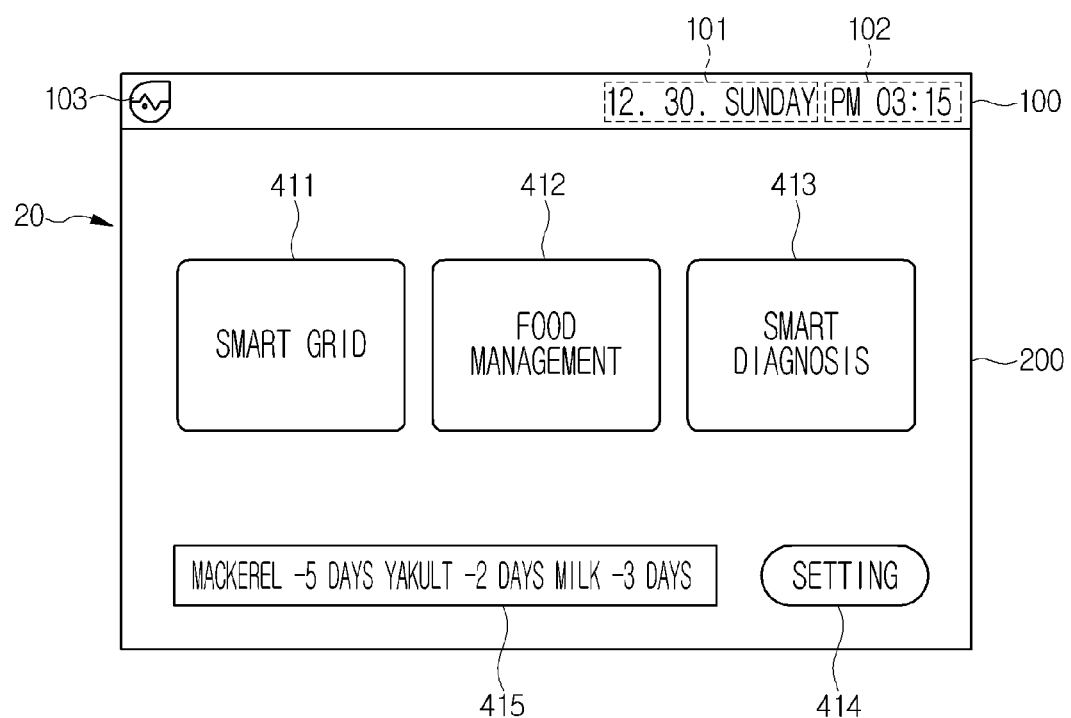
FIG. 3 is a view illustrating a screen displayed on a display unit of a refrigerator according to one embodiment of the present invention.

FIG. 3 is a view illustrating a screen displayed on a display unit of a refrigerator.

Referring to FIGS. 2 and 3, a screen displayed on the display unit 20 may include a first screen 100 and a second screen 200. For example, when a refrigerator is turned on, a screen may be displayed as shown in FIG. 3. The screen of FIG. 3 may be an initial screen of the display unit 20. The first screen 100 and the second screen 200 may be vertically disposed, for example, but may be horizontally disposed. The first screen 100 and the second screen 200 may be separated from each other, or may be a screen divided by displayed content. However, in this embodiment, the first screen 100 may be omitted.

The first screen 100 may display at least one of weather information 101, time information 102, and smart grid function on/off information 103. The smart grid function on/off information may vary depending on the ON or OFF status of the smart grid function. For example, the color, brightness, and saturation of displayed smart grid function information may vary depending on the ON or OFF status of the smart grid function.

In one embodiment, when a smart grid function is turned on, the refrigerator operates based on energy information. When the refrigerator operates based on energy information, the refrigerator performs a course on the basis of the energy information or the refrigerator displays the energy information. Of course, the refrigerator may operate based on additional information besides energy information. The energy information and the additional information may be received from an external source.

Moreover, at least one of a smart grid selection unit 411, a food management selection unit 412, and a smart diagnosis selection unit 431 may be displayed on the second screen 200. As shown in FIG. 3, the smart grid selection unit 411, the food management selection unit 412, and the smart diagnosis selection unit 431 may be displayed. When the smart grid selection unit 411 is selected, energy information may, for example, be confirmed. When the food management selection unit 412 is selected, stored food information may, for example, be confirmed. When the smart diagnosis selection unit 413 is selected, the refrigerator may, for example, be diagnosed.

Stored food related information 415 and a setting selection unit 414 may be further displayed on the second screen 200. The stored food related information may be expiration date information of a stored food. The information on each stored food may be displayed as a sliding text type. For example, expiration date information on foods stored in the refrigerator 10 may move in a horizontal or vertical direction. At this point, expiration date information on stored foods may be displayed in a specific area. In another example, the stored food related information 415 may be still text. For example, when the expiration date information of stored foods is displayed, information on some foods having an upcoming expiration date or some expired foods among the stored foods may be displayed.

According to one embodiment, food expiration date information may be confirmed without additional manipulation from a source outside of the refrigerator.

Figure 4:
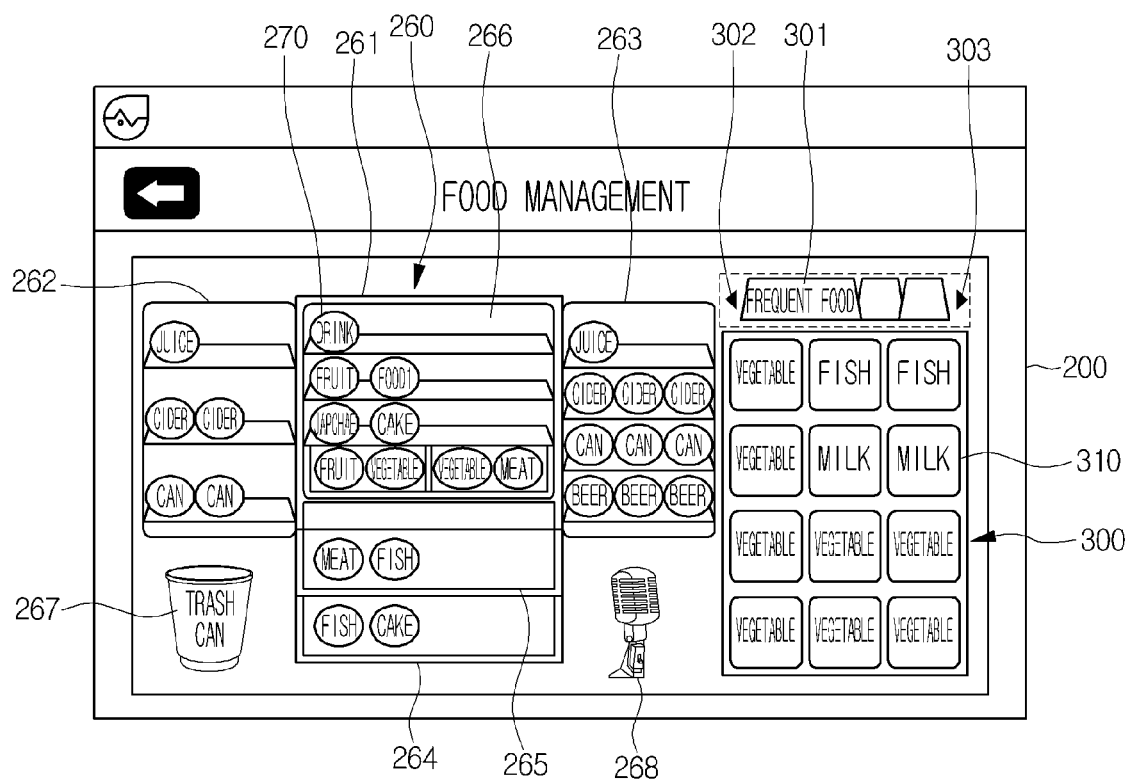
FIG. 4 is a view of a screen displayed when a food management selection unit is selected from the screen of FIG. 3 according to one embodiment of the present invention.

FIG. 4 is a view of a screen displayed when a food management selection unit is selected from a screen of FIG. 3 according to one embodiment of the present invention.

Referring to FIG. 4, when the food management selection unit 412 is selected from the screen of FIG. 3, a stored food position information screen 260 (hereinafter, referred to as "the food position information screen') for displaying the position of a stored food and a food list information screen 300 including display information of a food added to the food position information screen 260 may be displayed on the second screen 200.

The food position information screen 260 and the food list information screen 300 may be disposed in a horizontal or vertical direction. The food position information screen 260 may be displayed as a refrigerator form. That is, the food position information screen 260 may include a refrigerator compartment 261, refrigerator compartment doors 262 and 263, a freezer compartment 264, and a switching (or a special cooling) compartment 265. At least one storage space 266 for storing foods may be displayed in the refrigerator compartment 261, the refrigerator compartment doors 262 and 263, the freezer compartment 264, and the switching compartment 265. At least one storage food information 270 for displaying stored foods may be displayed in the storage space 266 of each of the refrigerator compartment 261, the refrigerator compartment doors 262 and 263, the freezer compartment 264, and the switching compartment 265.

The food list information screen 300 may display a food category 301 and at least one food display information 310 corresponding to the food category 301.

In one embodiment, information for displaying stored foods may be referred to as storage food information 270 and information displayed on the food list information screen 260 may be referred to as food display information 310. The storage food information 270 and the food display information 310 may be icons illustrated in food form. Each storage food information 270 displayed on the food position information screen 260 may include expiration date information. Colors of a number of storage food information 270 may vary depending on an expiration date. For example, the color of the almost expired storage food information 270 may be red, the color of the 3 days left before expiration date storage food information 270 may be orange, and the color of the more than 5 days left before expiration date storage food information 270 may be blue.

When a plurality of food categories are displayed on the food list information screen 300, a move selection unit for moving a food category may be further included. The plurality of food categories may include some or all of frequent foods, meat, fish, vegetables, fruits, diary products, processed foods, and user defined categories (i.e., user definition). A user may add a food category or change the name of a food category. In this embodiment, there is no limit in the names and number of food categories.

In each food category except the frequent food and the user definition, at least one food display information 310 for a corresponding food category may be predetermined. For example, meat may include predetermined pork, beef, chicken, and sausage. When a plurality of food display information 310 is defined in a specific food category, they may be arranged in a horizontal or vertical direction.

The second screen 200 may further display a trash can 267 for removing the storage food information 270 displayed on the food position information screen 260 therefrom and a voice input selection unit 268 for voice input.

Figure 5:
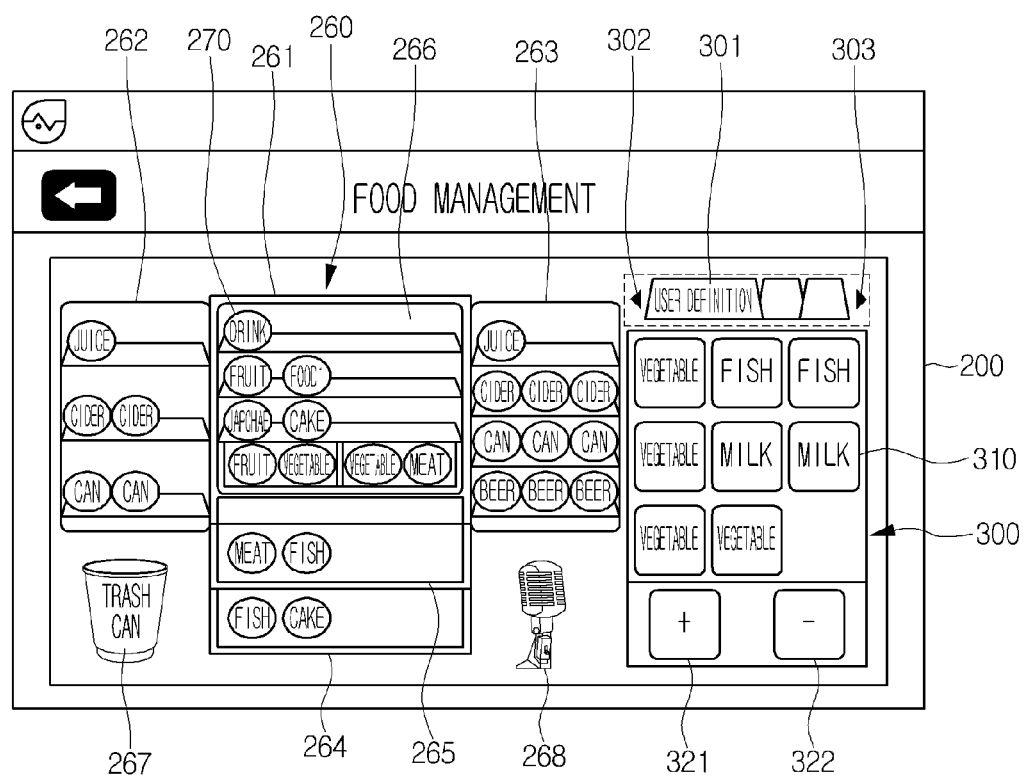
FIG. 5 is a view of a screen displayed when a user definition is selected from a food list information screen according to one embodiment of the present invention.

FIG. 5 is a view of a screen displayed when a user definition is selected from a food list information screen according to one embodiment of the present invention.

Referring to FIG. 5, when a user definition category is selected (displayed) from the food list information screen 300, the food list information screen 300 may further include an addition selection unit 321 for selecting and adding food through the food category 301 and the food display information 310 and a deletion selection unit 322 for selecting and deleting an added food. A user may define an undefined food by selecting the addition selection unit 321.

Figure 6:
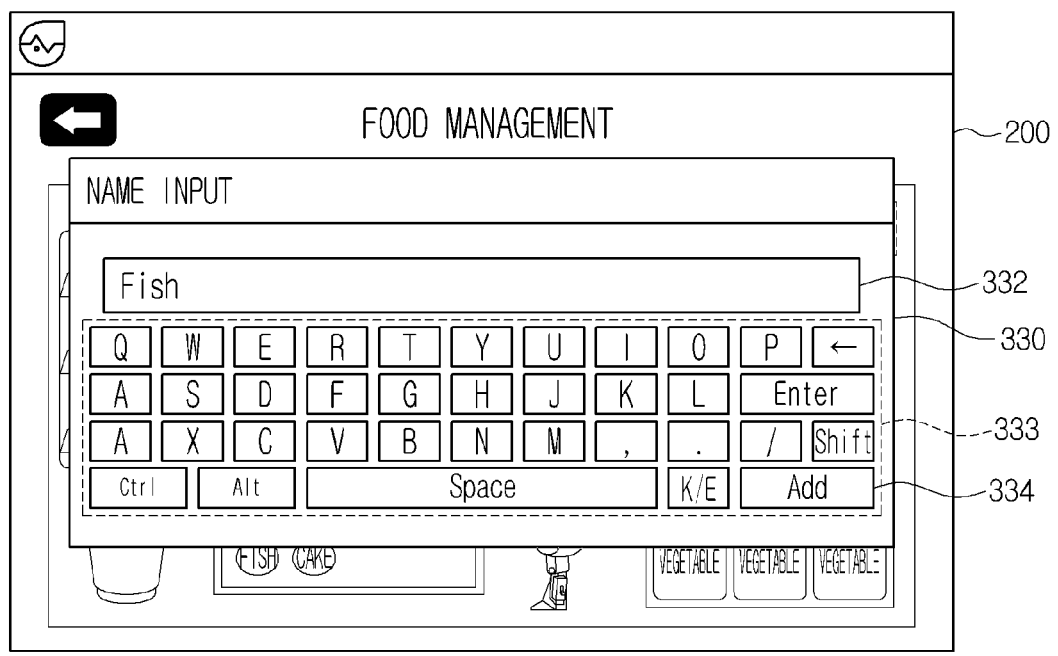
FIG. 6 is a view of a screen displayed when an addition selection unit is selected from the screen of FIG. 5 according to one embodiment of the present invention.

FIG. 6 is a view of a screen displayed when an addition selection unit is selected from the screen of FIG. 5 according to one embodiment of the present invention.

Referring to FIGS. 5 and 6, when the addition selection unit 321 is selected from the screen of FIG. 5, the second screen 200 may display an input screen 330 for inputting food information. The input screen 330 may be a pop up screen from the screen of FIG. 5 or a screen changing from the second screen 200.

The input screen 330 may display an input unit 333 for inputting a food name and a name display unit 332 for displaying an inputted food name. The inputted name may be in any language.

The input unit 334 may include an addition unit 334 selected when a food name input is completed.

Figure 7:
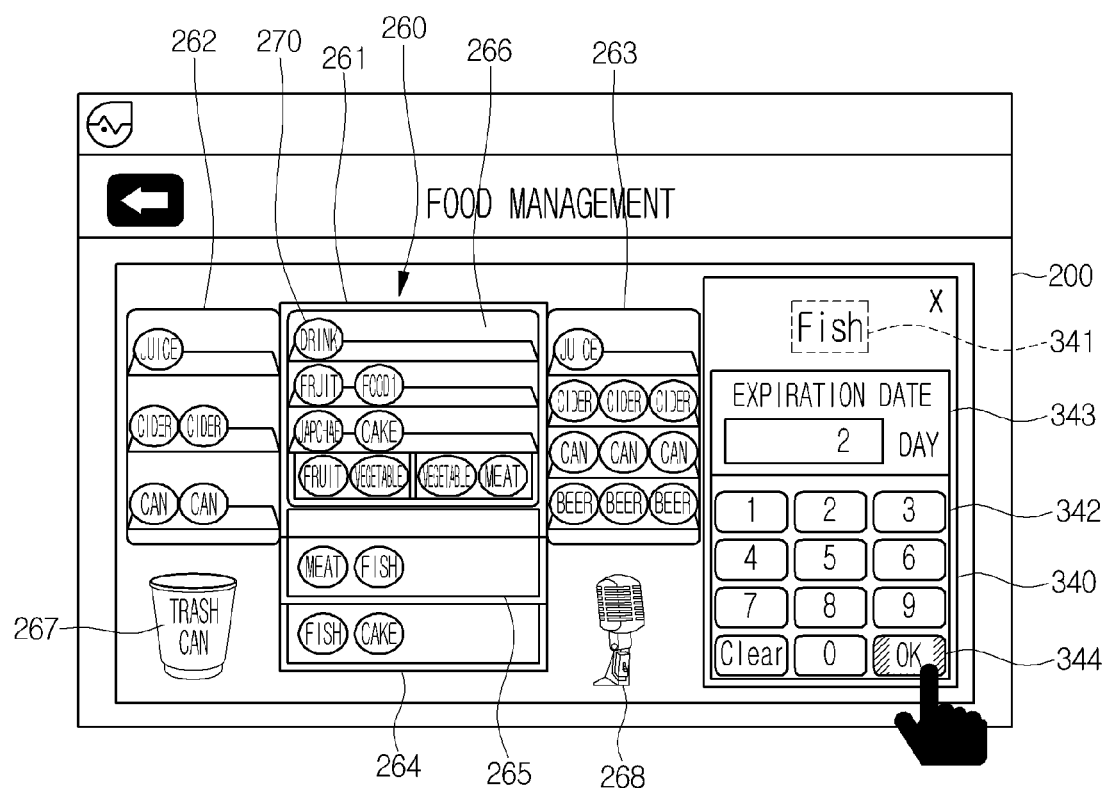
FIG. 7 is a view of a screen displayed when an addition unit is selected from the screen of FIG. 6 according to one embodiment of the present invention.

FIG. 7 is a view of a screen displayed when an addition unit is selected from the screen of FIG. 6 according to one embodiment of the present invention.

Referring to FIGS. 6 and 7, when the addition unit 334 is selected from the screen of FIG. 6, the second screen 200 may display an input screen 340 for inputting an expiration date. The input screen 340 for inputting an expiration date may be displayed at a position where the food list input screen 300 is normally displayed. The input screen 340 may display an inputted name 341, an input unit 342 for inputting an expiration date, and an expiration date display unit 343 for displaying inputted expiration date information. The input unit 342 may include a selection unit 344 selected when an expiration date input is completed. In one embodiment, the inputted expiration date may be remaining days from the inputted time (date).

Also, the food display information 310 predetermined in a food category except the user definition may include expiration date information besides a food name. That is, an expiration date of food predefined in the non-user definition food categories may be predetermined. The expiration date of food predefined in the non-user definition food categories cannot be changed on the food list display screen. In another example, the expiration date of food predefined in the non-user definition food categories cannot be changed on the food list display screen, but an expiration date of food displayed on the food position information screen may be changed by a user.

Figure 8:
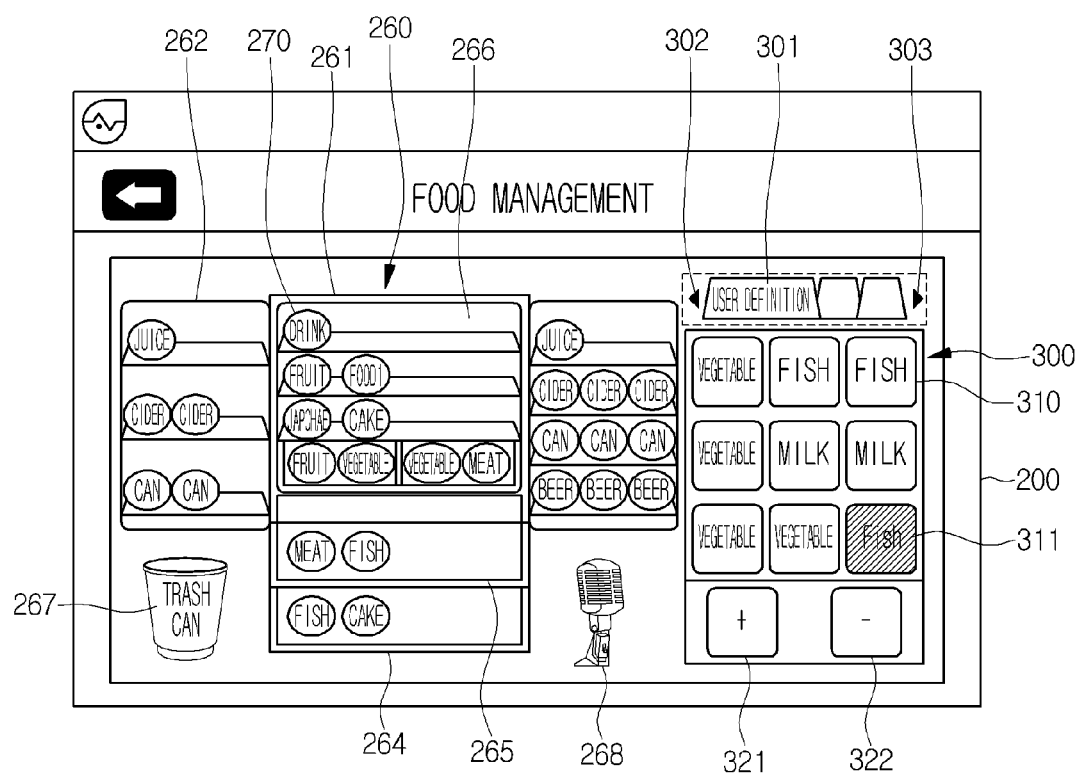
FIG. 8 is a view of a screen displayed when an expiration data input is completed from the screen of FIG. 7 according to one embodiment of the present invention.

FIG. 8 is a view of a screen displayed when an expiration data input is completed from the screen of FIG. 7 according to one embodiment of the present invention.

Referring to FIGS. 5 and 8, when the selection unit 344 is selected from the screen of FIG. 7, the food list information screen 300 may display the added food display information 311. For example, when there are eight added food display information 310 as shown in FIG. 5, the food list display screen 300 may display eight food display information 310 icons. When a user adds food later, as shown in FIG. 8, the food list display screen 300 may include a total of nine food display information 310 and 311 including newly added food display information 311.

Of course, when the deletion selection unit 322 is selected after the specific food display information 310 and 311 is selected as shown in FIG. 5 or 8, the corresponding food display information 310 and 311 may be deleted (i.e., they disappear from the food list display screen 300).

Figure 9:
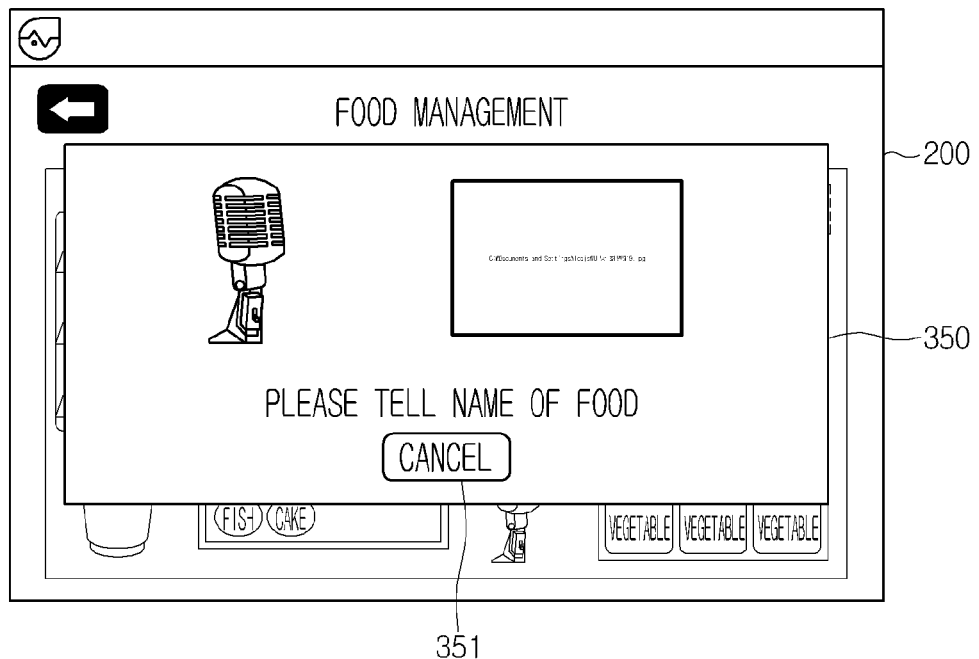
FIG. 9 is a view of a screen displayed when a voice input selection unit is selected from the screen of FIG. 5 or 8 according to one embodiment of the present invention.

FIG. 9 is a view of a screen displayed when a voice input selection unit is selected from the screen of FIG. 5 or 8.

Referring to FIG. 9, when the voice input selection unit 268 is selected from the screen of FIG. 5 or 8, the second screen 200 may display the voice input screen 350. After the voice input screen 350 is displayed, a user may input the name of food through voice. At this point, the refrigerator 10 may include a microphone (not shown) for inputting voice.

The voice input screen 350 may display a cancel selection unit 351 for cancelling voice input. When the cancel selection unit 351 is selected, the screen of FIG. 9 may switch back to the screen of FIG. 5 or 8.

Figure 10:
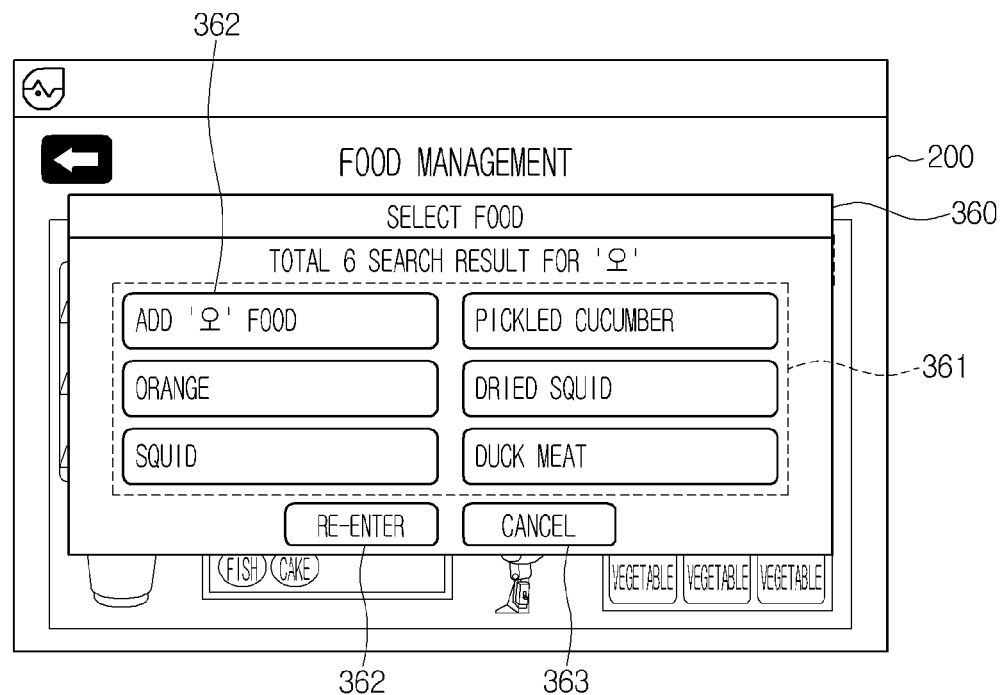
FIG. 10 is a view of a screen displayed when a voice input is completed from the screen of FIG. 9 according to one embodiment of the present invention.

FIG. 10 is a view of a screen displayed when a voice input is completed from the screen of FIG. 9 according to one embodiment of the present invention.

Referring to FIG. 10, when a voice input is completed from the screen of FIG. 9, the second screen 200 may display an input result screen 360. The input result screen 360 may display at least name information related to an inputted voice. Besides name information on a predefined food, a food name may be undefined. Also, name information of a food related to an inputted voice may be additionally stored in the memory unit 40. For example, when a user inputs "오", the input result screen 360 may display food name information 361 including "오". The input result screen 360 may further display a selection unit 362 selected for inputting the name of a food not displayed. When the food name information displayed on the screen of FIG. 10 is selected, the screen of FIG. 7 is displayed. When the selection unit 362 is selected from the screen of FIG. 10, the screen of FIG. 6 is displayed.

Figure 11:
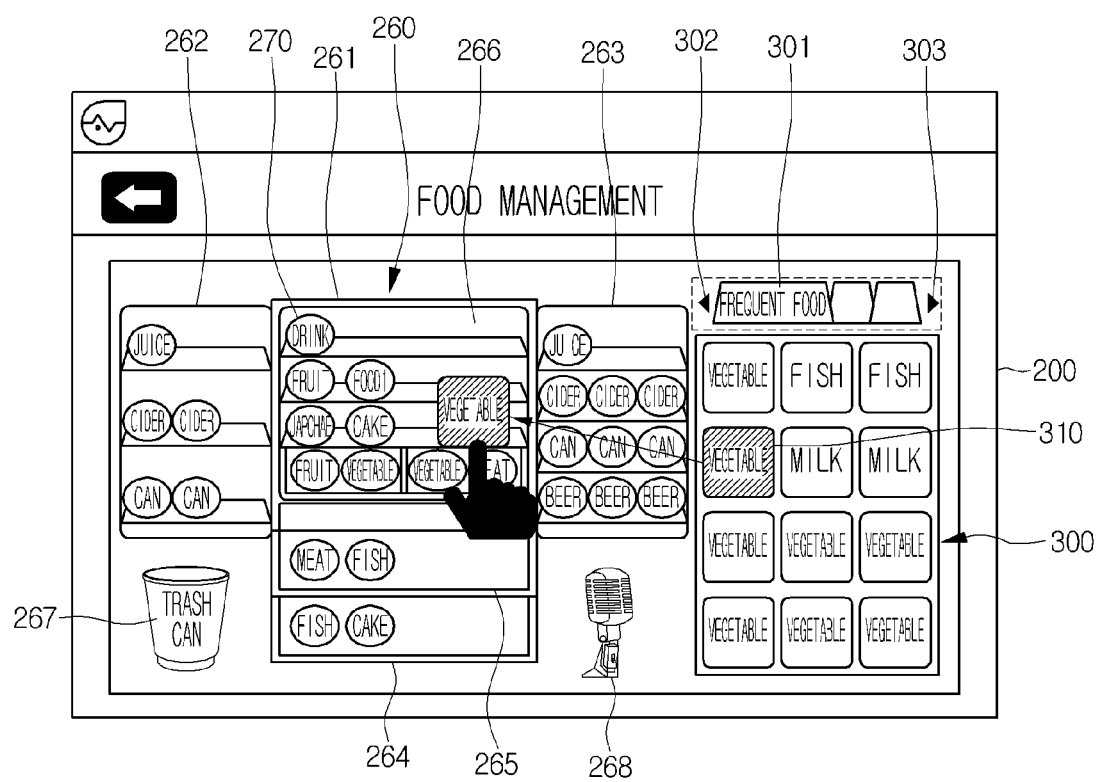
FIG. 11 is a view illustrating a method of moving a specific food displayed on a food list information screen into a food position information screen according to one embodiment of the present invention.

FIG. 11 is a view illustrating a method of moving a specific food displayed on a food list information screen into a food position information screen according to one embodiment of the present invention.

Referring to FIG. 11, specific food display information 310 displayed on the food list information screen 300 is selected. The selected food display information 310 is dragged and moved to a specific storage compartment of the food position information screen 260 so that the selected storage food information 270 may be added to the specific storage compartment. At this point, the selected food display information 310 is not deleted from the food list information screen 300 and the storage food information 270 is added to the food position information screen 260.

Figure 12:
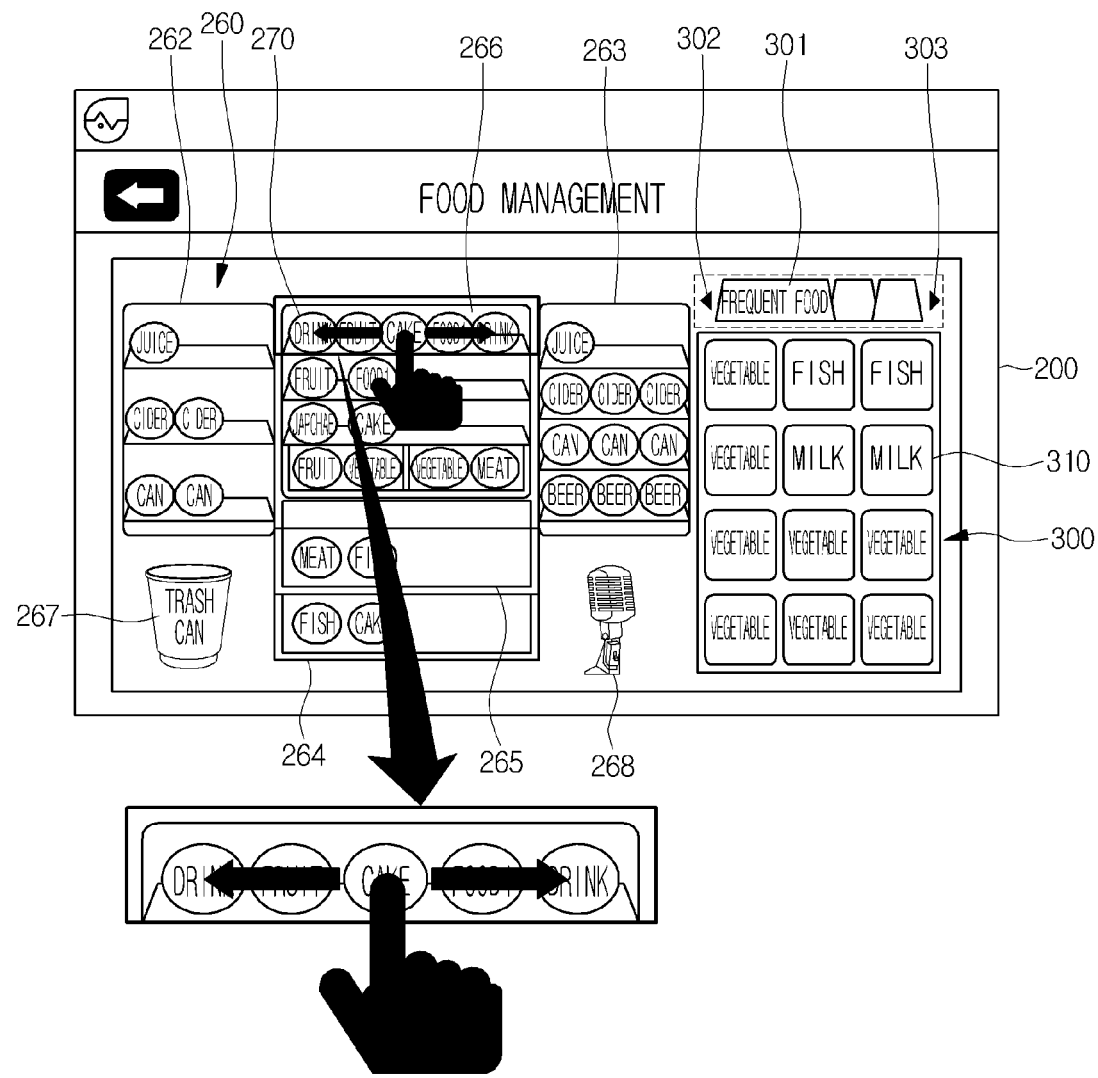
FIG. 12 is a view illustrating a method of confirming food information stored in a specific storage room of a food position information screen according to one embodiment of the present invention.

FIG. 12 is a view illustrating a method of confirming food information stored in a specific storage compartment of a food position information screen according to one embodiment of the present invention.

Referring to FIG. 12, when an area other than storage food information is selected from an area of a specific storage compartment 261 displayed on the food position information screen 261, the specific storage compartment 261 is enlarged and displayed. By selecting the storage food information 270 from the enlarged specific storage compartment 261 and scrolling it in a horizontal direction, at least one storage food information 270 stored in the specific storage compartment 261 may be confirmed. When there are a plurality of storage food information 270 in the specific storage compartment 261, some of the plurality of storage food information 270 may be displayed or the plurality of storage food information 270 may overlap. In this case, it is difficult to accurately confirm the plurality of storage food information 270 in the specific storage compartment 261. However, according to one embodiment, by selecting the storage food information 270 from the enlarged specific storage compartment 261 and scrolling it in a horizontal direction, the plurality of storage food information 270 may be accurately confirmed.

Figure 13:
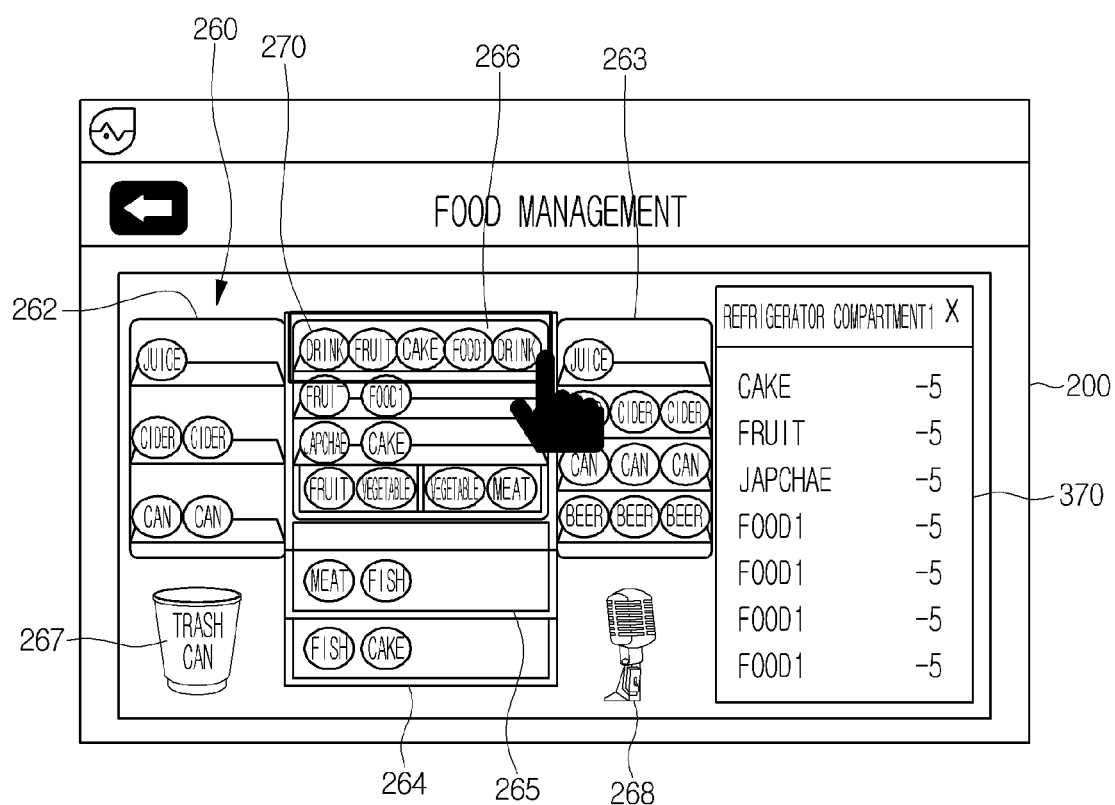
FIG. 13 is a view illustrating a method of confirming food information stored in a specific storage room of a food position information screen according to another embodiment of the present invention.

FIG. 13 is a view illustrating a method of confirming food information stored in a specific storage compartment of a food position information screen according to another embodiment of the present invention.

Referring to FIG. 13, when an outline portion of the specific storage compartment 261 displayed on the food position information screen 261 is selected, the storage food list screen 370 stored in the specific storage compartment 261 may be displayed. The storage food list screen 370 may be displayed at a position corresponding to the food list information screen 300. Information displayed on the storage food list screen 370 may include the name and expiration date of a stored food.

Figure 14:
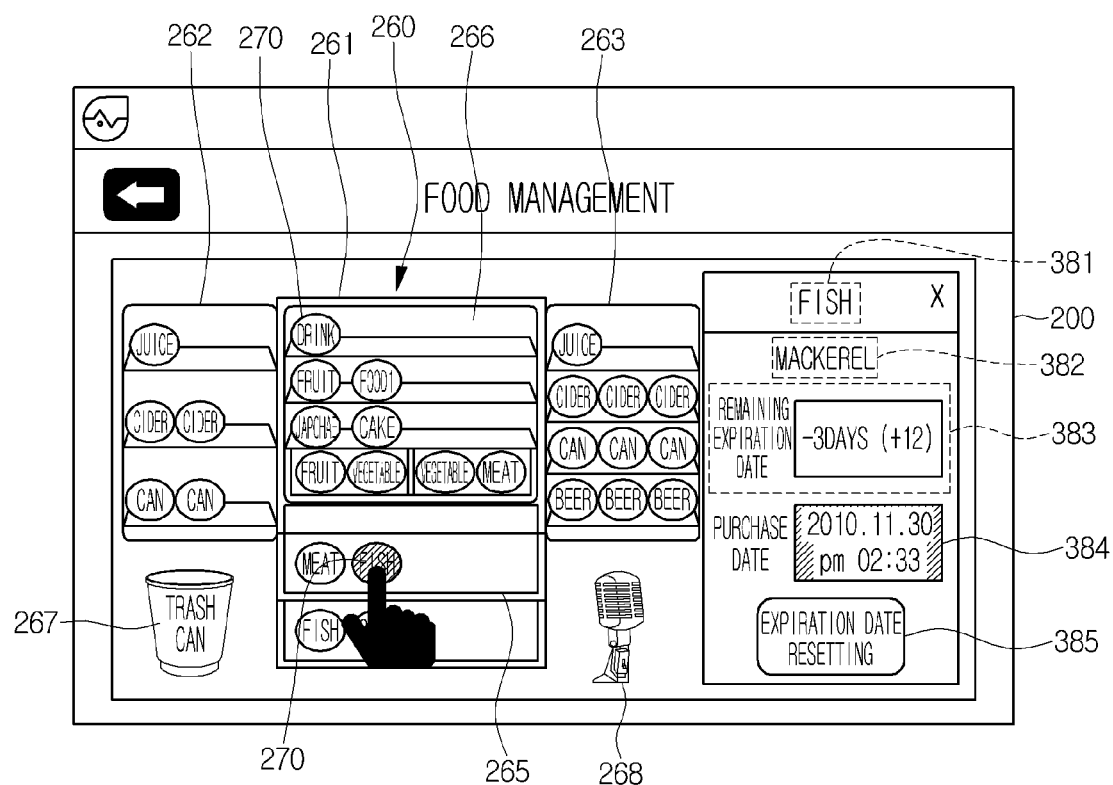
FIG. 14 is a view of a screen displayed when specific storage food information displayed on a food position information screen is selected according to one embodiment of the present invention.

FIG. 14 is a view of a screen displayed when specific storage food information displayed on a food position information screen is selected according to one embodiment of the present invention.

Referring to FIG. 14, when the specific storage food information 270 displayed on the food position information screen 260 is selected, the second screen 200 may display a detailed information screen 380 of the selected storage food information. The detailed information screen 380 may be displayed at a position corresponding to the food list information screen 300.

The detailed information screen 380 may display at least one of food category information 381, a food name 380, expiration date information 383, purchase date information 384, an expiration date reset selection unit 385. The expiration date information 383 may include remaining expiration date information and period information from a purchase date to a current date.

Figure 15:
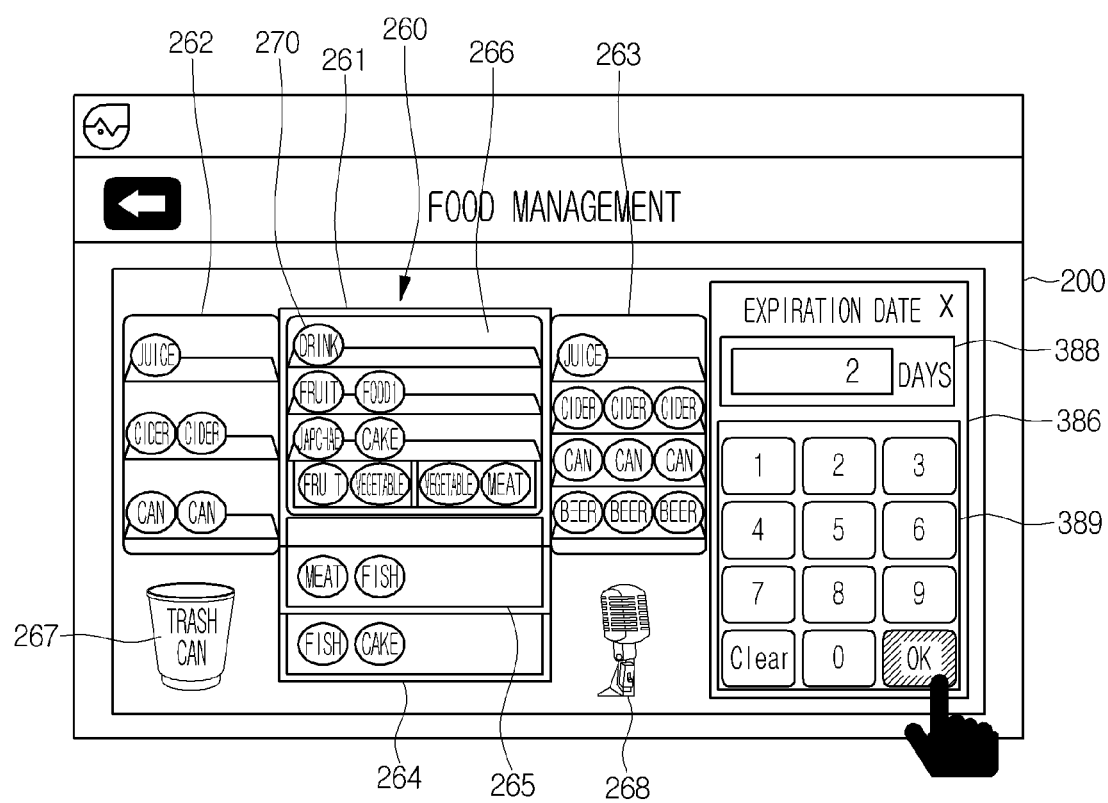
FIG. 15 is a view of a screen displayed when an expiration date reset selection unit is selected from the screen of FIG. 14 according to one embodiment of the present invention.

FIG. 15 is a view of a screen displayed when an expiration date reset selection unit is selected from the screen of FIG. 14 according to one embodiment of the present invention.

Referring to FIG. 15, when the expiration date reset selection unit 385 is selected from the screen of FIG. 14, the second screen 200 may display an input screen 386 for inputting an expiration date. The input screen 386 for inputting an expiration date may be displayed at a position where the food list input screen 300 is displayed. The input screen 386 may display an input unit 387 for inputting an expiration date and an expiration date display unit 388 for displaying the inputted expiration date information. The input unit 387 may include a selection unit 389 selected when an expiration date input is completed. In one embodiment, the inputted expiration date may be remaining days from the inputted time (date). When the selection unit 389 is selected, the screen of FIG. 4 or 14 may be displayed.

Figure 16:
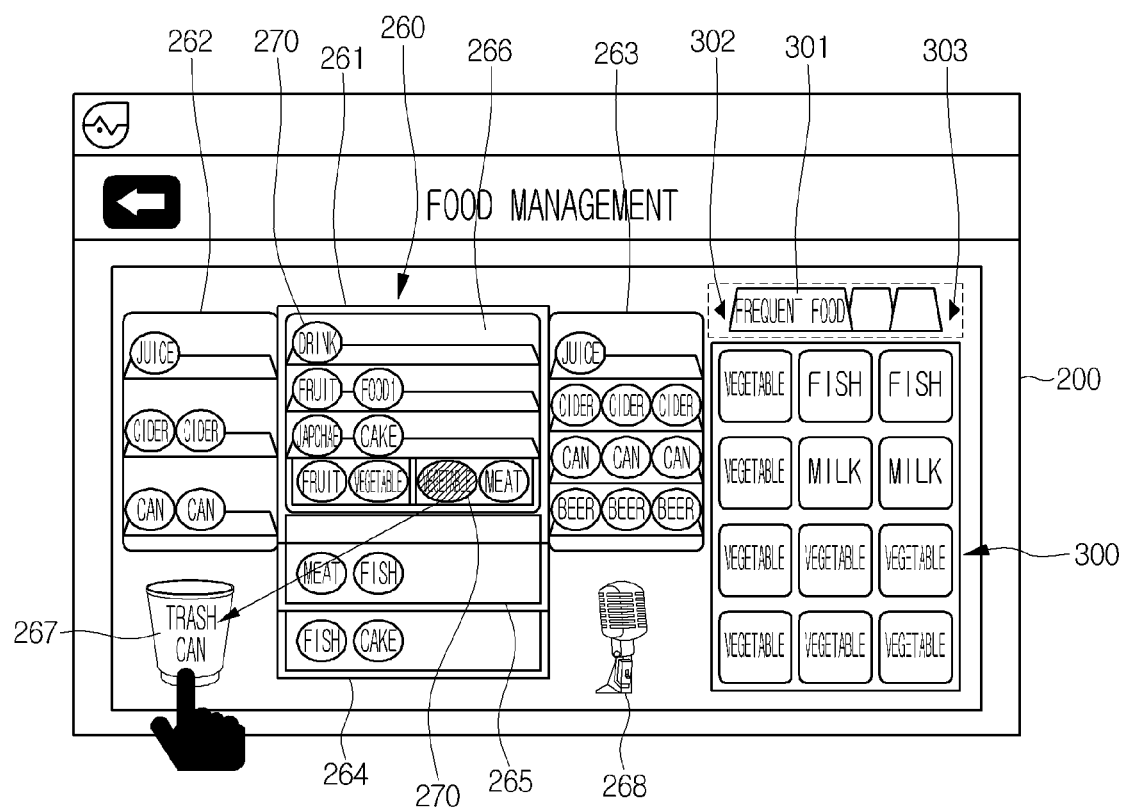
FIG. 16 is a view illustrating a method of deleting storage food information displayed on a food position information screen according to one embodiment of the present invention.

FIG. 16 is a view illustrating a method of deleting storage food information displayed on a food position information screen according to one embodiment of the present invention.

Referring to FIG. 16, specific storage food information 270 displayed on the food position information screen 260 is selected. Then, when the selected storage food information 270 is dragged and moved to the trash can 267, the storage food information 270 selected from a specific storage compartment disappears (i.e., the storage food information 270 is removed from the specific storage compartment).

Figure 17:
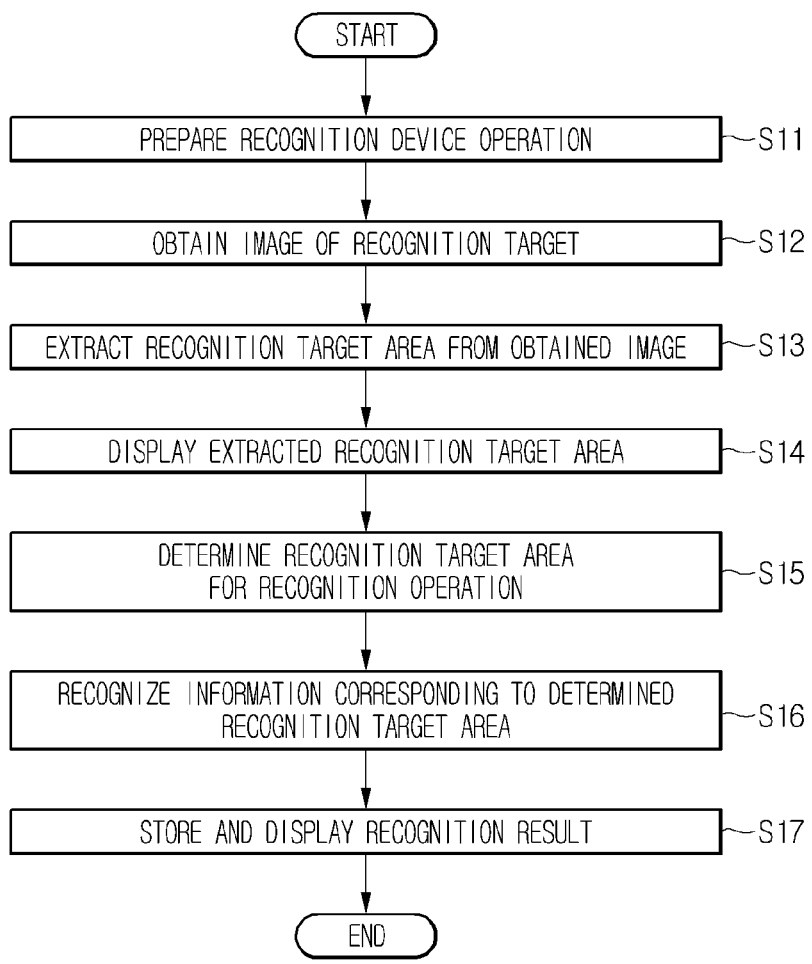
FIG. 17 is a flowchart illustrating a method of operating a recognition device according to an embodiment of the present invention according to one embodiment of the present invention.

FIG. 17 is a flowchart illustrating a method of operating a recognition device according to an embodiment of the present invention. FIGS. 18 to 22 are views illustrating a screen displayed on a display unit of a refrigerator.

Figure 18:
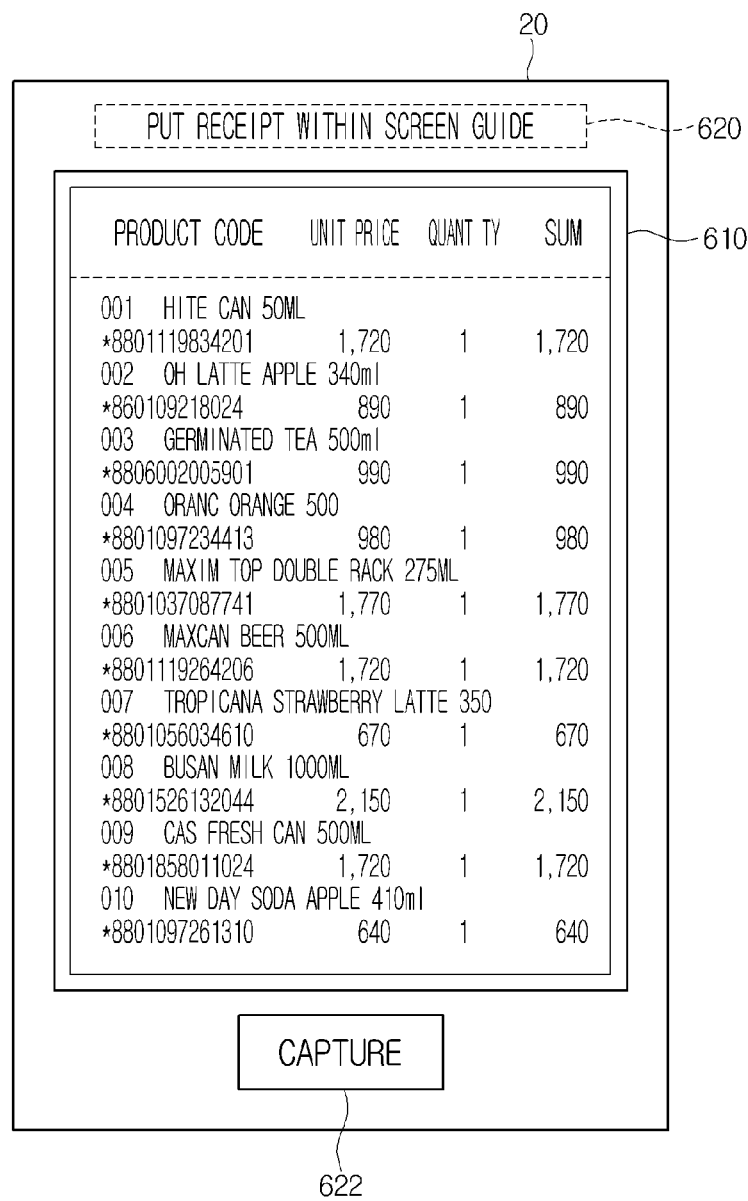

Referring to FIGS. 17 to 22, the recognition device 30 prepares an operation thereof to recognize a recognition target in operation S11. That is, the recognition device 30 is activated. Once the recognition device 30 is activated, the display unit 20 displays a guide frame 610 to guide the position of the recognition target 500 on the display unit 20 as shown in FIG. 18. Additionally, the display unit 20 may display guide information 620 to place the position of a recognition target on the guide frame 610.

The display unit 20 may display a capture button 622 to obtain an image of the recognition target 500. Accordingly, once the capture button 622 is selected, an image of the recognition 500 within the guide frame 610 is obtained in operation S12.

In another example, if the capture button 622 is not selected and a predetermined time elapses after the recognition target 500 is placed within the guide frame 610, an image of the recognition 500 within the guide frame 610 is obtained automatically.

Figure 19:
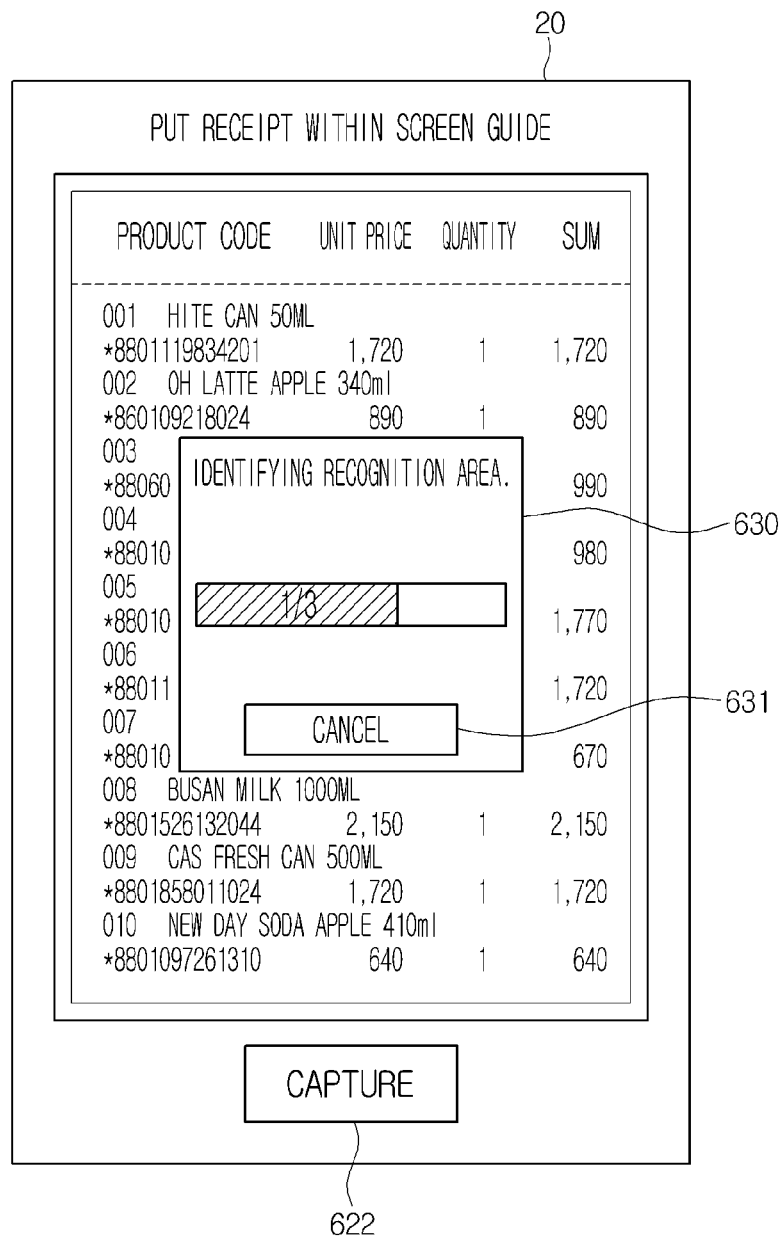

After the image of the recognition target 500 is obtained, a recognition target area is extracted from the obtained image in operation S13. At this point, while the recognition target area is being extracted, information 630 for notifying recognition target area extraction status may be displayed as shown in FIG. 19.

The display unit 20 may display a cancel button 631 for cancelling the extraction of a recognition target area. Accordingly, when the cancel button 631 is selected, the extraction of the recognition target area is cancelled and the screen of FIG. 19 returns to the screen of FIG. 18.

Once the recognition target area is extracted from the obtained image, the display unit 20 displays the recognition target area 640 as shown in FIG. 20. At this point, the recognition target area 640 and a non-recognition target area are displayed separately. For example, the recognition target area 640 and a non-recognition target area may be displayed separately by a line or a rectangular frame.

In one embodiment, the recognition target area 640 is an area necessary for recognizing a product from the entire obtained image. If there is information on a plurality of products in the obtained image, the display unit 20 displays a plurality of recognition target areas 640. The plurality of recognition target areas 640 may be arranged in a vertical or horizontal direction. At this point, the plurality of recognition target areas 640 may be displayed separately.

A method of extracting the recognition target area 640 will now be described.

When the recognition device 30 obtains an image of a recognition target 500, the control unit 50 divides the obtained image into a plurality of pixels. Each pixel has an original coordinate value. Then, the control unit 50 determines a grey value of each pixel to assign an original value to each pixel. For example, when a gray value of a pixel exceeds a reference value, 1 is assigned and when a gray value is less than the reference value, 0 is assigned.

Then, the control unit 50 extracts a recognition target area on the basis of an original value of each pixel. For example, as shown in FIG. 20, the obtained image includes numbers of products purchased 001 and 002, a product name 643, a product code 644, price, and quantity. At this point, the control unit 50 extracts a recognition target area by using at least one of the numbers of products 001 and 002, the product name 643, and the product code 644 as a determination criteria.

When the determination criteria is a product number and a shape that pixels assigned with 1 form is 0 or 1 within a specific coordinate range, based on this, a predetermined range is extracted as a recognition target area.

In one embodiment, extracting a recognition target area is not extracting product information from an image but extracting an area necessary for recognition from an image. The reason for extracting an area necessary for recognition is to reduce a recognition time necessary for extracting product information from an image. That is, when unnecessary information is not recognized from information on an image, a recognition time may be reduced.

The extracted recognition target area 640 may include at least one of a product name 643 and a product code 644. However, information included in the recognition area 640 is not limited to the above and thus, may include quantity, price, and purchase date, if necessary.

The display unit 20 may further display a selection unit 641 for selecting the extracted recognition target area 640. The selection unit 641 is used for selecting a management target product and non-management target product. Without the selection unit 641, a recognition target area for recognition may be determined by touching the recognition target area 640. In this case, a recognition target area for recognition and a recognition target area for no recognition are displayed separately.

A user may determine a management target product and a non-management target product by confirming a product name in a recognition target area displayed on the display unit 20. Then, a user may select the selection unit 641 corresponding to a management target product. That is, a recognition target area for recognition may be selected. At this point, an unselected product becomes an actual non-management target product.

In one embodiment, although a user selects a management target product through the selection unit 641, a non-management target product (i.e., a recognition target area for no recognition) may be selected through the selection unit 641. That is, after a recognition target area is extracted, all products are basically determined as management target products. Also, a user may select a non-management target product (i.e., a recognition target area for no recognition) from the display unit 20 through the selection unit 641. For example, a "✓" shape is displayed on each selection unit 641 and a user selects a corresponding selection unit 641, so that the "✓" shape may be removed.

By selecting a management target product or a non-management target product through a user, a recognition target area 640 for recognition is finally determined in operation S15. However, while food may be a management target product, it may be classified as a non-management target product through a user's selection.

As shown in FIG. 20, the display unit 20 may display a complete button 651 selected for recognizing information corresponding to the recognition target area 640 or a cancel button 652 for cancelling recognition.

Also, the control unit 50 recognizes information corresponding to the recognition target area 640, i.e., information in the recognition target area 640, in operation S16. However, when the cancel button 652 is selected, the method returns to the screen of FIG. 18.

Figure 21:
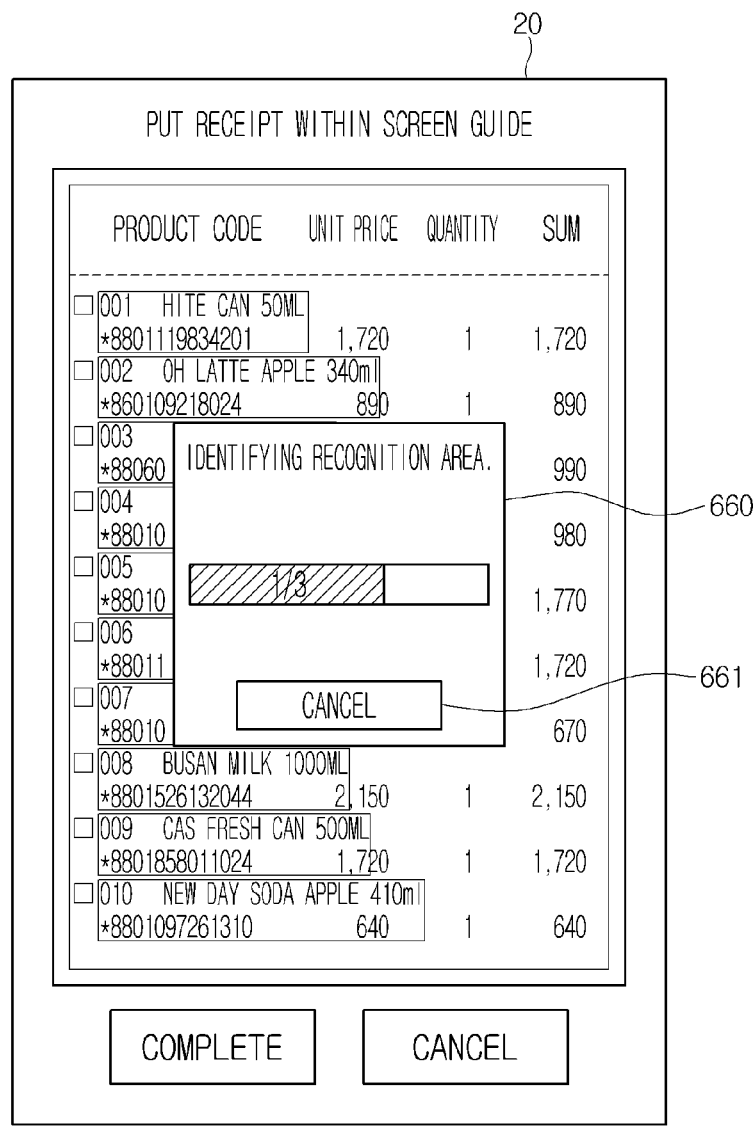

Moreover, when the complete button 651 is selected as shown in FIG. 20, the display unit 20 may display information 660 for notifying that information of a recognition target area is currently recognized as shown in FIG. 21. Additionally, the display unit 20 may display a cancel button 661 for cancelling information recognition of a recognition target area.

Figure 22:
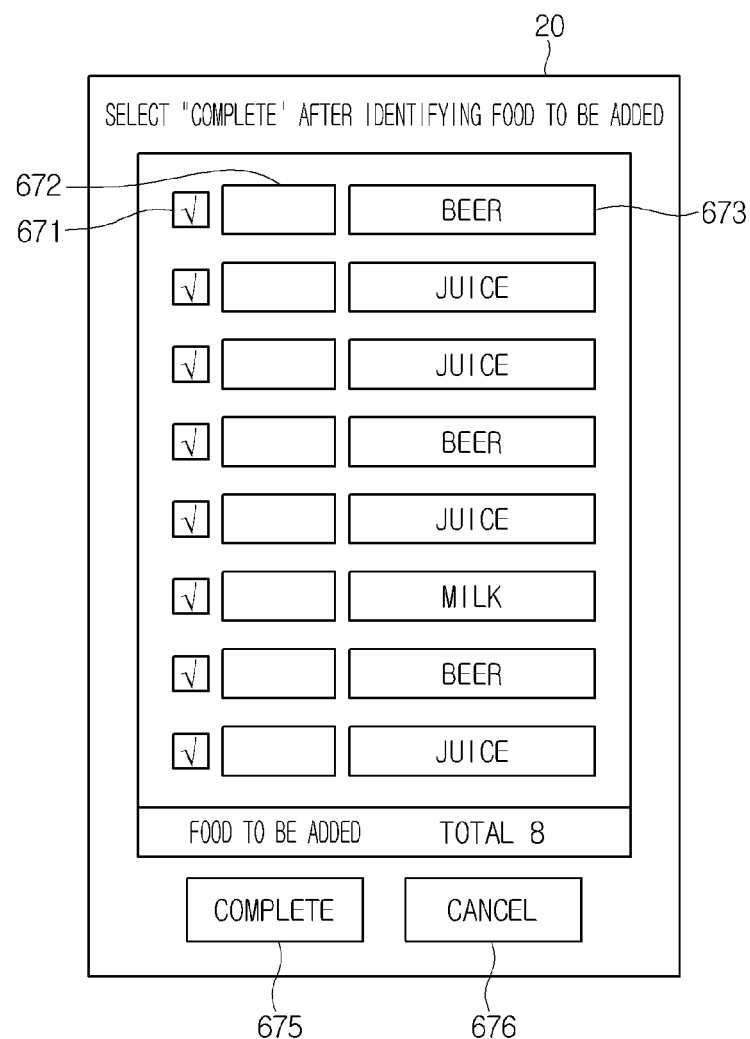

Accordingly, when the cancel button 661 is selected as shown in FIG. 22, the information recognition of the recognition target area is cancelled and the screen of FIG. 21 returns to the screen of FIG. 18.

Moreover, when the recognition target area 640 includes various types of information, a recognition priority between various types may be determined.

For example, when the plurality of types include a product code and a product name, the control unit 50 recognizes the product code first and compares it with information stored in the memory unit 40. The memory unit 40 may store a product code, a product name corresponding thereto, and a product category that the product name belongs (i.e., a product category that recognized information belongs).

Accordingly, the control unit 50 determines whether the recognized product code is identical to a product code stored in the memory unit 40. If the recognized product code is identical to the product code stored in the memory unit 40, the display unit 20 displays a product category or a product name corresponding to the recognized product code in operation S17.

At this point, if the recognized product code is not identical to the product code stored in the memory unit 40, the control unit 50 does not recognize a product name in a recognition target area. This is to reduce a recognition time of the control unit 50.

The memory unit 40 may include a first memory storing a product code for a comparison of a recognized product code and a second memory storing a product category or a product name for management. At this point, the first memory and the second memory may be additional configurations or may be storage spaces divided in the memory unit 40.

However, if the recognized product code is not identical to the product code stored in the memory unit 40, the control unit 50 recognizes a product name in a recognition target area and then, compares it with information stored in the memory unit 40. A product name to be compared with the recognized product name may be stored in the memory unit 40.

If the recognized product code is identical to the product name stored in the memory unit 40, the display unit 20 displays the recognized product name or a product category that the recognized product name belongs in operation S17.

In one embodiment, although a product code is recognized first and a product name is recognized after a comparison of information in the memory unit 40, after the product code and name are recognized, it is possible to compare the product code with information stored in the memory unit 40. In this case, when the recognized product code is not identical to the product code stored in the memory unit, since a product name is not compared with a product name stored in the memory unit, a recognition time of the control unit 50 may be reduced.

When information in a recognition target area is recognized completely, as shown in FIG. 22, the display unit 20 may display category information 673 corresponding to the recognized product code or product name. Additionally, the display unit 20 may display icon information 672 corresponding to the category information 673. Of course, it is possible to hide one of the category information 673 and the icon information 672.

Moreover, the display unit 20 may finally display a selection unit 671 for selecting a management target. Since the function of the selection unit 671 is identical to that of the selection unit 641 of FIG. 20, its detailed description is omitted.

The display unit 20 may further display total number information of a product (or, category) added to a management target.

Additionally, the display unit 20 may display a complete button 675 selected to start management of a displayed product and a cancel button 676 for cancelling management of a displayed product.

Moreover, when a recognized product code and product name are not identical to a product code and a product name stored in the memory unit 40, the display unit 20 may display recognized information itself, i.e., a recognized product name itself. In this case, a user may modify a product name and when the modified product name is identical to a product name stored in a memory unit, a product category corresponding to the product name may be displayed.

Additionally, when the control unit 50 attempts to extract a recognition target area from an obtained image, if there is no recognition target area to be extracted, the display unit 20 may display information for an image recapturing request.

In the screen of FIG. 22, once the complete button 675 is selected, information such as a selected product category 673, a corresponding product category including a product name, the number of product names, or a current date is stored in the memory unit 40.

In one embodiment, when the control unit extracts a recognition target area without recognizing information of an obtained entire image and determines the recognition target area, since information in the determined recognition target area is recognized, a recognition time of the control unit may be reduced.

Since the extracted recognition target is displayed on a display unit, a user may select a non-management target product, and when the non-management target product is selected, information of a recognition target area corresponding to the non-management target product is not recognized, so that a recognition time of the control unit may be further reduced.

Figure 23:
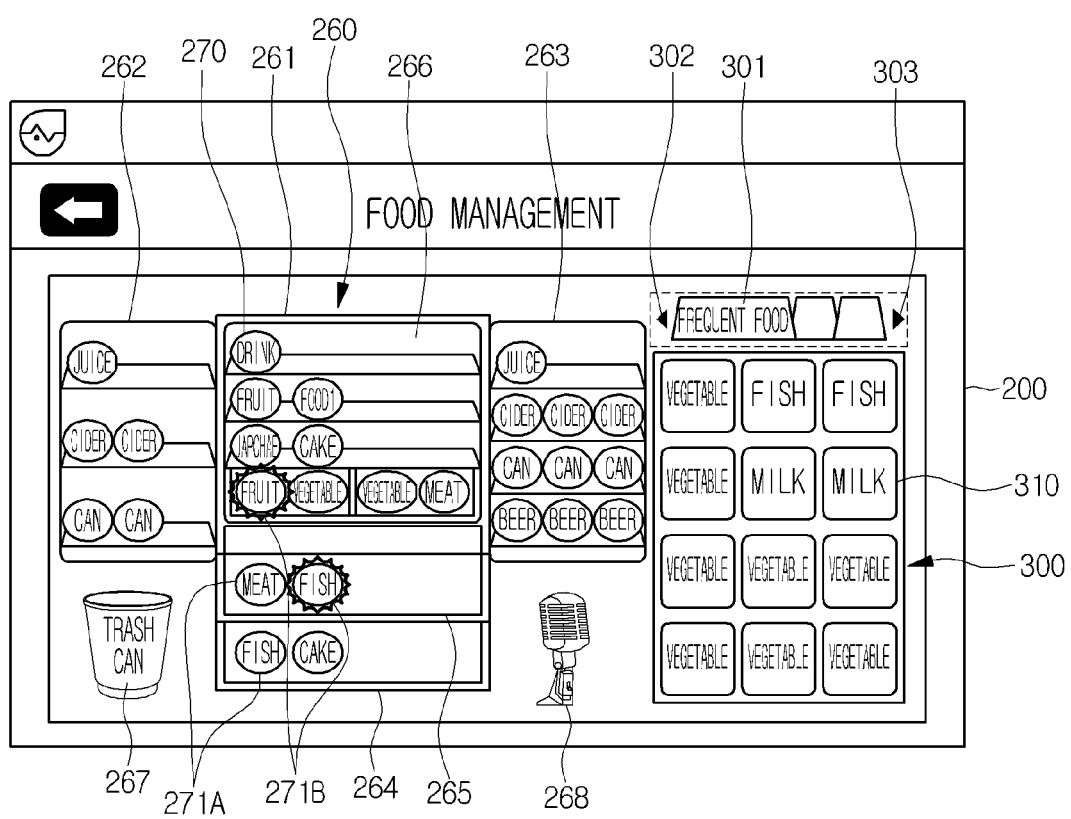
FIG. 23 is a view illustrating a screen displayed on a display unit after a recognition target is recognized in a recognition device according to an embodiment of the present invention.

FIG. 23 is a view illustrating a screen displayed on a display unit after a recognition target is recognized in a recognition device according to an embodiment of the present invention.

Referring to FIGS. 2, 22, and 23, when the complete button 675 is selected from the screen of FIG. 22, the display unit 20 may display a food position information screen 260. That is, the screen of FIG. 22 switches to display the screen of FIG. 23.

The food position information screen 260 may display information related to a pre-stored food 271A (or a food managed in a refrigerator) and information related to an added food 271B (e.g., fish and fruit in FIG. 23). At this point, the information related to the pre-store food 271A and the information related to the added food 271B are displayed to be compared on the display unit 20.

For example, the color or letter size of the pre-stored food 271a may be different from that of the added food 271B.

For example, the icon shape, size, or color of the pre-stored food 271a may be different from that of the added food 271B. Or, the added food 271B may be flashed. The added food 271B may stop flashing after a predetermined time.

Moreover, the display unit 20 may further display an expected storage position of the added food 271B. For example, the added food 271B may be automatically disposed at an expected storage position on the food position information screen 260. Referring to FIG. 23, if the added food 271B is fish, it may be disposed in a freezer compartment. If the added food 271B is fruit, it may be disposed in a refrigerator compartment or a vegetable compartment.

After the position of the added food 271B is determined automatically, a user may change a storage position of the added food 271B. For example, after touching the position of the fish, i.e., the added food 271B, a user may drag and move it to refrigerator compartment.

When a user changes the position of the added food 271B, the added food 271B may be displayed in the same shape as the pre-stored food 271B. That is, when the storage position of the added food 271B is changed, its color, letter size, icon shape, icon size, or icon color may become the same as the pre-stored food 271A or its flashing may disappear.

According to one embodiment, since information related to an added food is stored and displayed on the display unit 20 automatically by recognizing a recognition target through a recognition device without direct information input by a user (hereinafter, referred to as "food related information"), such as a food name (or a food category), a storage position, and an expiration date, user's convenience may be improved.

As shown in FIG. 23, when the recognition device 30 in a refrigerator completely recognizes the recognition target 500, a display unit displays the information related to the added food 271B automatically. However, after a recognition device of a terminal 80 communicating with a refrigerator completely recognizes a recognition target, if recognized information is received from the terminal 80, the display unit may display the information related to the added food 271B in the same manner and the memory unit may store the information related to the added food 271B.

Figure 24:
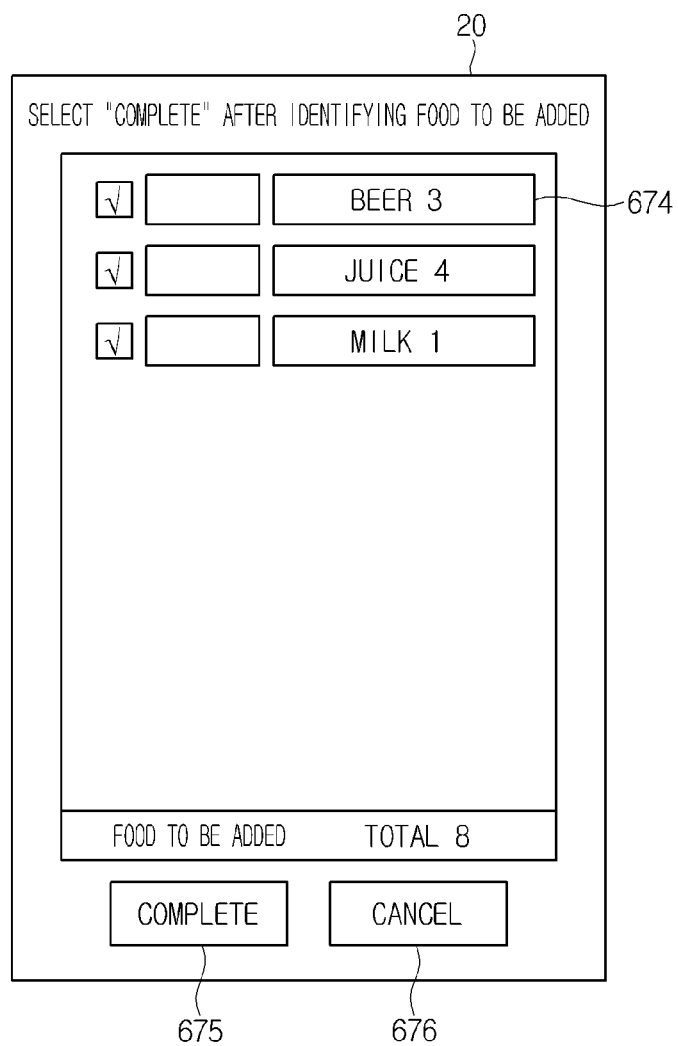
FIG. 24 is a view illustrating a screen displayed on a display unit of a refrigerator according to another embodiment of the present invention according to one embodiment of the present invention.

FIG. 24 is a view illustrating a screen displayed on a display unit of a refrigerator according to another embodiment of the present invention.

Referring to FIG. 24, after recognizing information in a recognition target area shown in FIG. 20 is completed, the display unit 20 may display category information 674. At this point, the category information 674 may include number information. In another example, in addition to the category information 674, number information of a corresponding category may be displayed.

In the above embodiment, although a refrigerator is described as one example of an electric product, it is clear that contents for recognizing product information are identically applied to other electric products besides the refrigerator.

Additionally, a method of operating a recognition device described in this specification is identically applied to a terminal, and also, in this specification, the terminal is included in the electric product. In this case, the terminal may transmit information of a product selected as a management target product to the refrigerator.

Additionally, buttons displayed on a display unit in this specification may be replaced with an input unit equipped separate from a display unit. That is, a complete command occurring when a complete button is selected or a cancel command occurring when a cancel button is selected may be inputted through the input unit.

Figure 25:
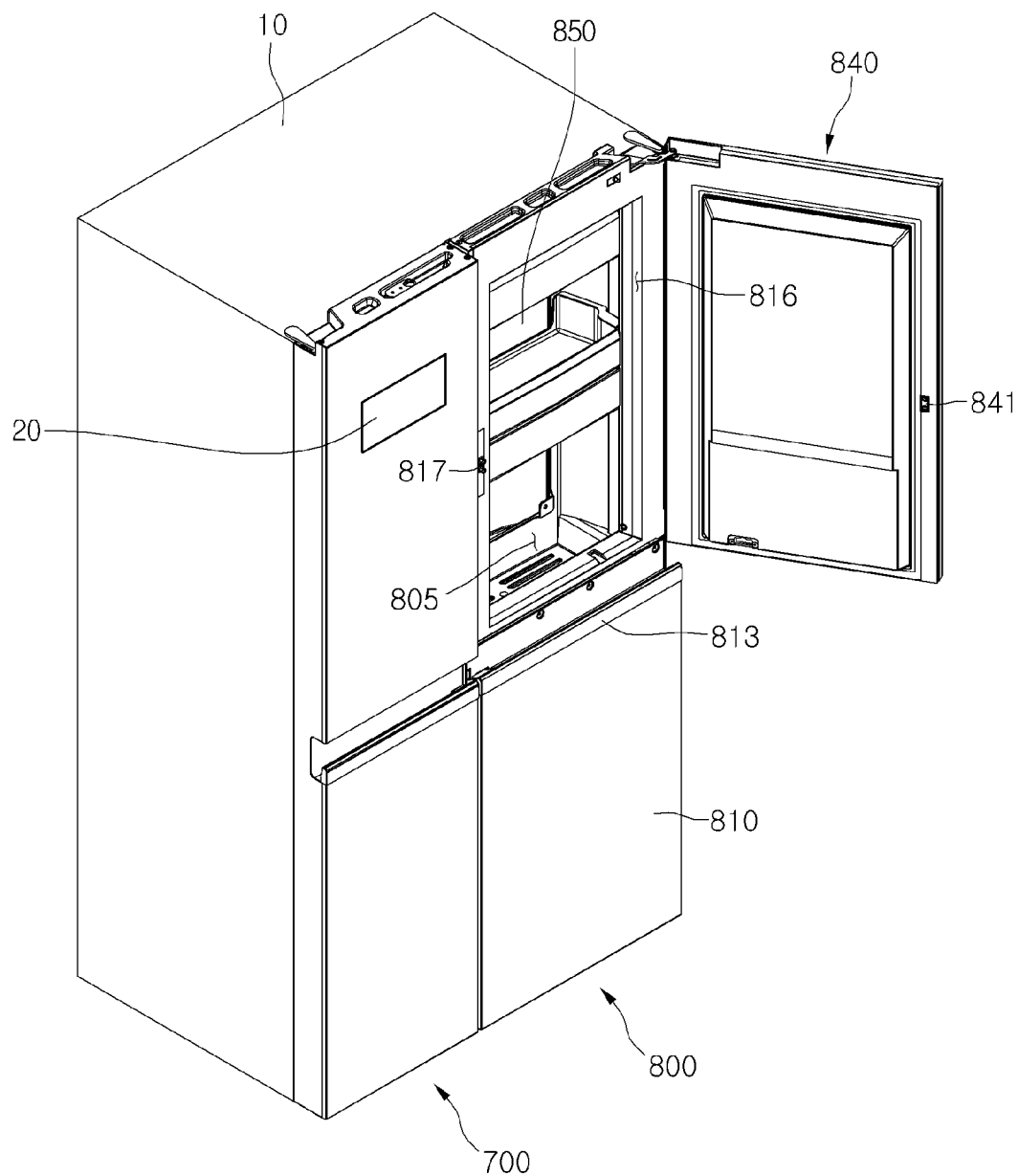
FIG. 25 is a view illustrating a refrigerator in the network system configuration of FIG. 1 according to one embodiment of the present invention.
Figure 26:
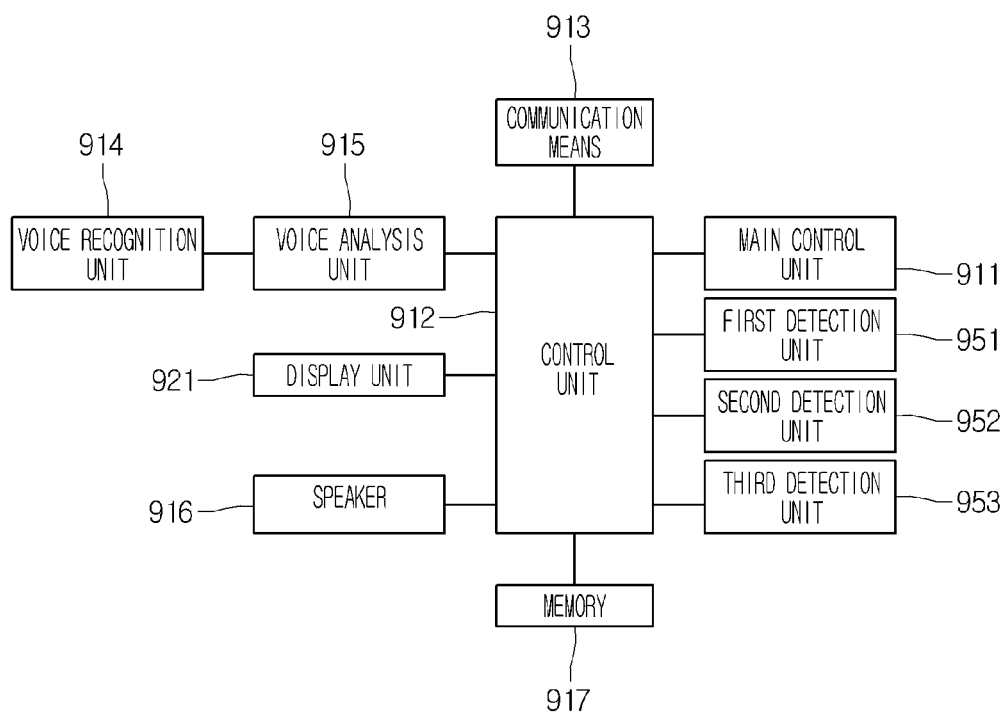
FIG. 26 is a block diagram illustrating the refrigerator of FIG. 25 according to one embodiment of the present invention.

FIG. 25 is a view illustrating a refrigerator of an electric product within the network system configuration of FIG. 1. FIG. 26 is a block diagram illustrating the refrigerator of FIG. 25 accordingly to one embodiment of the present invention.

Referring to FIGS. 25 and 26, the refrigerator 10 may include a cabinet having a storage compartment and doors 700 and 800 opening/closing the storage compartment.

The storage compartment may include a freezer compartment (not shown) and a refrigerator compartment (not shown). The freezer compartment may include a special cooling compartment. The special cooling compartment may be understood as a storage compartment where foods are stored at a lower temperature than foods stored in the freezer compartment. The special cooling compartment may be opened/closed by a special cooling compartment door.

As shown in FIG. 25, although a side by side type refrigerator where a freezer compartment is equipped at the left and a refrigerator compartment is equipped at the right is described as one example, it is clear that the scope of the present invention is applied to various kinds of refrigerators such as a top mount type refrigerator where a freezer compartment is positioned at the top and a freezer compartment is positioned at the bottom, a bottom freezer type refrigerator where a refrigerator compartment is positioned at the bottom and a refrigerator compartment is positioned at the top, or a refrigerator including only one of a freezer compartment and a refrigerator compartment.

The doors 700 and 800 may include a freezer door 700 opening/closing the freezer compartment and a refrigerator door 800 opening/closing the refrigerator compartment.

A receiving device 850 for receiving food is equipped at the rear of the refrigerator door 800. The receiving device 850 may form a home bar space 805. The receiving device 850 may be detachable from the rear of the refrigerator door 800.

The refrigerator door 800 may include a main door 810 opening/closing the refrigerator compartment and a sub door 840 rotatably connected to the main door 810.

The main door 810 may include an opening 816, and the opening 816 may communicate with the home bar space 805. Additionally, the home bar space 805 may communicate with the refrigerator compartment. In the case of a bottom freezer type refrigerator, at least one of a plurality of refrigerator doors may include a main door and a sub door.

The sub door 840 rotates to open the opening 816, while the main door 810 closes the refrigerator compartment.

A latch hook 841 may be formed at the rear of the sub door 840 to combine with the main door 810, and a latch slot 817 may be formed at the main door 810 to combine with the latch hook 841.

Since structures of the latch hook 841 and the latch slot 817 are well known, their detailed descriptions are omitted.

Moreover, the refrigerator may further include a communication means 913 directly or indirectly communicating with an external component, a display unit 921 displaying at least one of refrigerator information and information received from the outside, a display unit control unit 912 controlling the display unit 921, and a main control unit 911 connected to the display unit control unit 912 and controlling an operation of the refrigerator.

The external component may be a web server, a mobile phone, another electric product, a power company's server, a product's purchase server, and a food's purchase server. The refrigerator may perform wired/wireless communication with an external component through the communication means 913. In this specification, there is no limit to the communication types and any well-known technique may be used.

Additionally, the refrigerator may further include a voice recognition unit 914 recognizing external voice, a voice analysis unit 915 analyzing a voice inputted through the voice recognition unit 914, a speaker 916 outputting voice to the outside, and a memory unit 917 storing information.

The display unit 921 may include a touch screen for inputting or selecting information through a touch method, for example. As another example, the display unit 921 may simply display information and may receive information through an additional input unit. Additionally, some information is inputted on the display unit 921, and remaining information is inputted through an additional input unit.

The display unit 921 may be disposed on at least one of the freezer door 700 and the refrigerator door 800. Or, the display unit 921 may be equipped at a cabinet.

The voice recognition unit 914 may be a microphone, and may be provided in plurality. The voice analysis unit 915 compares and analyzes voices inputted from the plurality of voice recognition unit 914, so that analysis error due to noise may be reduced. The voice analysis unit 915 analyzes an inputted voice to extract information necessary for an operation (e.g., a cooling function, a food management function, and a memo function) of the refrigerator and transmits the extracted information to the display unit control unit 912.

The display unit control unit 912 may recognize at least food information and information necessary for food management. The food information includes a food category (e.g., a category such as vegetable, meat, fruit, fish, diary product, and cereal) or a food name. The information necessary for food management may include at least one of a storage start date, a storage end date, a standard storage period, a storage position, a storage quantity (number or weight), and a storage method. The food management target may be storage position management, storage period management, storage quantity management, and storage method management.

Additionally, the storage period management target may include at least one of a storage elapse period from a storage start date to a current date, a storage remaining period from a current date to a storage end date (a expiration date), a storage end date, and whether it reaches a standard storage period. The display unit control unit 912 may perform food management on the basis of the recognized food information and the information necessary for the food management. Here, whether it reaches the standard storage period determines whether the standard storage period is within the standard date or whether the standard storage period exceeds the standard date.

The food information and the information necessary for food management may be selected or inputted on the display unit 921 or may be inputted by text or voice through an additional input unit.

Additionally, the refrigerator includes a first detection unit 951 detecting the opening/closing of the refrigerator door 700, a second detection unit 952 detecting the opening/closing of the main door 810 of the refrigerator door 800, and a third detection unit 953 detecting the opening/closing of the sub door 840 of the refrigerator compartment door 800.

The display unit control unit 912 controls the display unit 921 on the basis of information detected from each of the detection units 951 to 953 in connection with each of the detection units 951 to 953.

As another example, if the display unit control unit 912 is not provided, the main control unit 911 may control the display unit 921. In this case, the main control unit 911 controls the display unit 921 on the basis of information detected from each of the detection units 951 to 953 in connection with each of the detection units 951 to 953.

In another example, the main control unit 911 may transmit the information detected from each of the detection units 951 to 953 to the display control unit 912 in connection with each of the detection units 951 to 953, and the display unit control unit 912 may control the display unit 921 on the basis of the received information.

Figure 27:
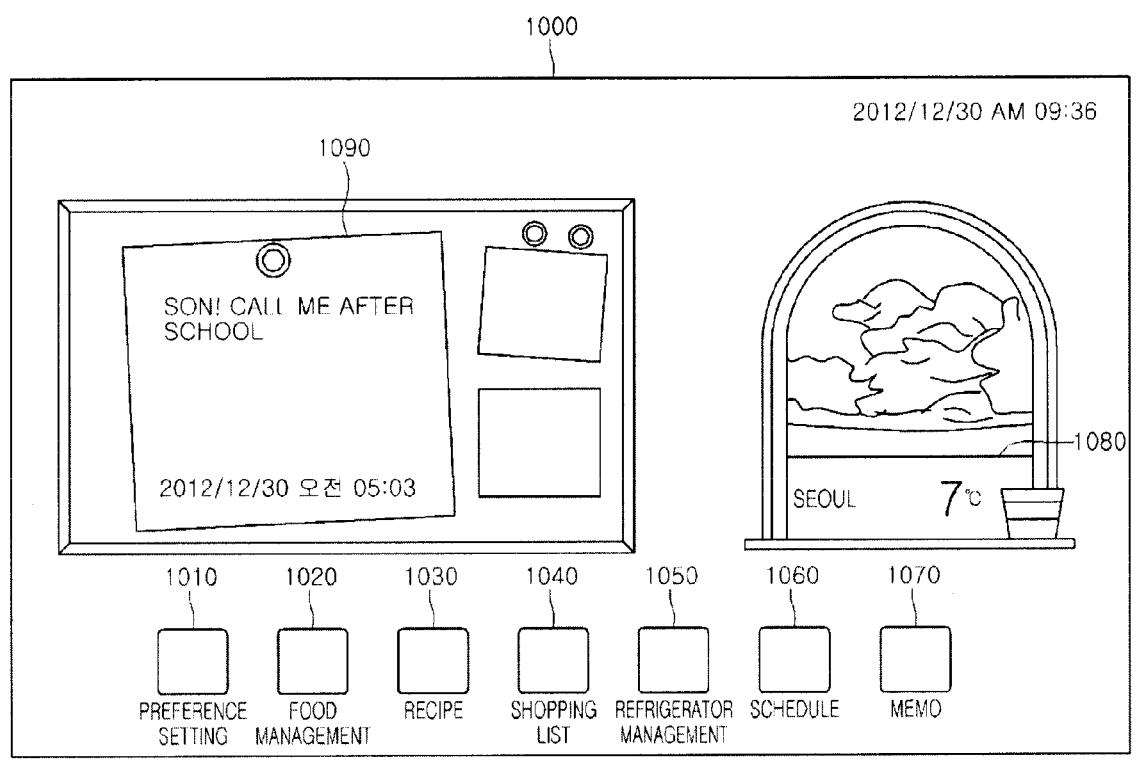
FIG. 27 is a view of a screen displayed on the display unit of FIG. 26 according to one embodiment of the present invention.

FIG. 27 is a view of a screen displayed on the display unit of FIG. 26 according to one embodiment of the invention.

Referring to FIG. 27, when a refrigerator is turned on, the display unit 921 may display a main screen 1000.

Or, when the refrigerator is turned on and the display unit 921 is touched in a sleep state of the display unit 921, the display unit 921 may display the main screen 1000.

The main screen 1000 may display selection units 1010, 1020, 1030, 1040, 1050, 1060, and 1070 for selecting various functions of the refrigerator, weather information 1080, memo information 1090, and schedule information.

The selection unit may include at least one of the preference setting selection unit 1010 setting an operating condition of the display unit 921, the food management selection unit 1020 selected for managing foods stored in the refrigerator, the recipe selection unit 1030 selected for recipe generation or inquiry, the shopping list selection unit 1040 selected for managing foods for shopping, the refrigerator management selection unit 1050 selected for managing a cooling function of the refrigerator, the schedule selection unit 1060 selected for managing a schedule, and the memo selection unit 1070 selected for writing a memo. As another example, the main screen 1000 may display the screens of FIGS. 3 to 16.

In this specification, the selection unit displayed on the main screen 1000 may include a selection unit related to a cooling function of a refrigerator and a selection unit related to an additional function besides the cooling function. Hereinafter, the case that the food management selection unit 1020 is selected from the main screen 1000 will be described.

Then, when a specific selection unit is selected from the main screen 1000, it may display a function management screen (or, a detail screen) corresponding to a selection unit. The screens of FIGS. 3 to 16 are function management screens.

Figure 28:
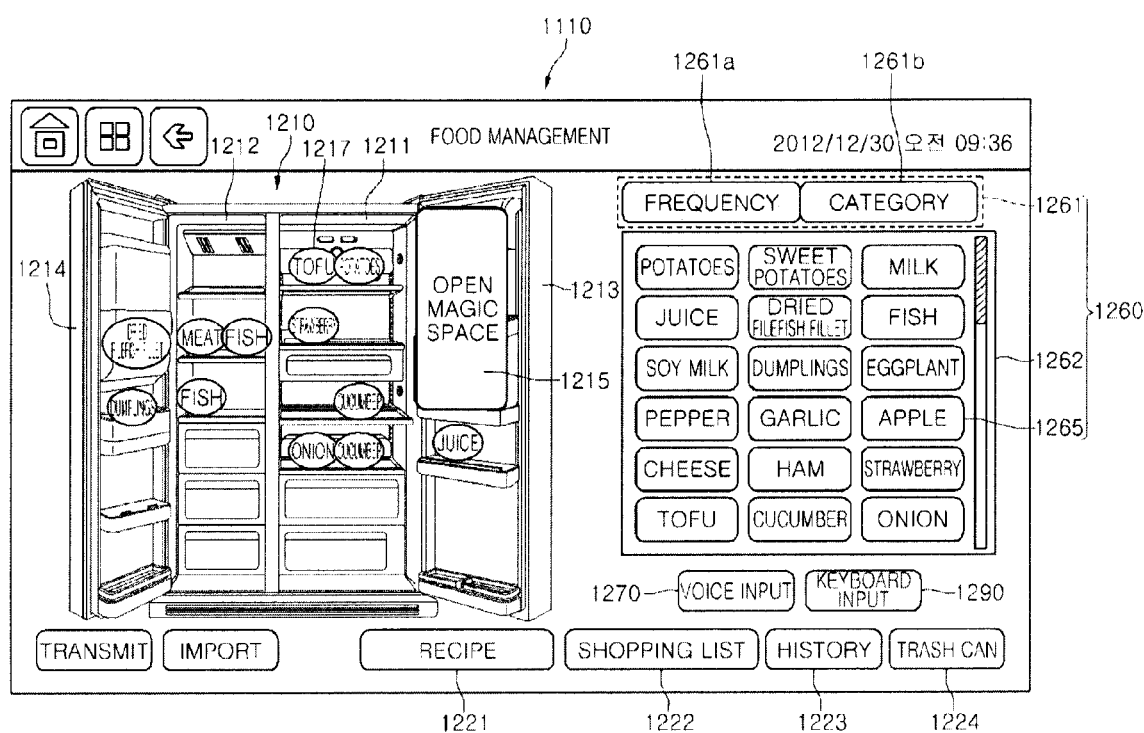
FIG. 28 is a view of a screen displayed when a food management selection unit is selected from the screen of FIG. 27 according to one embodiment of the present invention.

FIG. 28 is a view of a screen displayed when a food management selection unit is selected from the screen of FIG. 27 according to one embodiment of the invention.

Referring to FIG. 28, when the food management selection unit 1020 is selected from the main screen of FIG. 27, the display unit 921 displays the food management screen 1100, one example of a function management screen. The food management screen 1110 may display food position information 1210 displaying the position of a stored food, and food list information 1260 including display information on a food added as a food management target.

Moreover, the food management screen 1110 may further display a recipe selection unit 1221 selected for confirming recipe information, a shopping list selection unit 1222 selected for confirming shopping list information, a history selection unit 1223 confirming past food consumption information, a voice input selection unit 1270 adding food as a food management target through voice input, a keyboard input selection unit 1290 (e.g., a text input selection unit) adding a food as a food management target by directly inputting text (e.g., letter, symbol, and number) through a user, and a trash can 1224 used for removing a food from storage management target food.

The food position information 1210 and the food list information may be separately displayed on the food management screen 1110 and may be disposed in a horizontal or vertical direction. The food position information 1210 may be displayed as a refrigerator form.

That is, the food position information 1210 may separately include refrigerator compartment information 1211, refrigerator compartment door information 1213, freezer compartment information 1212, freezer compartment door information 1214, and home bar information 1215. The refrigerator compartment information 1211, the freezer compartment information 1212, the refrigerator compartment door information 1213, the freezer compartment door information 1214, and the home bar information 1215 may include at least one storage space information. The refrigerator compartment information 1211, the freezer compartment information 1212, the refrigerator compartment door information 1213, and the freezer compartment door information 1214 may include at least one storage food information 1217 displaying stored food. The storage food information 1217 may include food information or the number of food information.

Then, when the home bar information 1215 is selected as shown in FIG. 28, the display unit 921 may display the screen of FIG. 29 described later.

The food list information 1260 may include a category selection unit 1261 and a food information display unit 1262 displaying information corresponding to the food category 1261. The food information display unit 1262 may display food display information 1265 or a food category.

One of a frequency category 1261*a* and a food classification category 1261*b* may be selected through the category selection unit 1261. A food information display unit 1262 displayed when a frequency category is selected is shown in FIG. 28. At least one food display information 1265 may be arranged in a high storage frequency order and displayed on the food information display unit 1262.

In this specification, foods in a food category are pre-stored in the memory 917, and foods not stored in the memory 917 may be manually added by a user.

Besides the frequency category 1261*a* and the food classification category 1261*b*, a user may add a new category. For example, by adding a user preference category, a food that a user prefers is confirmed by selecting a user preference category.

After selecting the specific food display information 1265 from the food information display unit 1262, a user drags the selected food display information 1265 and moves it to a specific storage space of a screen where the food position information 1210 is displayed. As a result, the specific storage food information 1217 may be added to the specific storage space. At this point, the food display information 1265 selected from the food information display unit 1262 is not deleted from the food list information 1260 and is added as the storage food information 1217 to the food position information screen 1210.

At this point, a color representing the storage food information 1217 in the food position information 1210 may vary depending on storage period information.

After the specific storage food information 1217 on the food position information 1210 is selected and dragged, and then moved to the trash can 1224, the specific storage food information 1217 is removed from the food position information 1210. That is, the storage food information 1217 moved to the trash can 1224 is deleted from the food management target.

Figure 29:
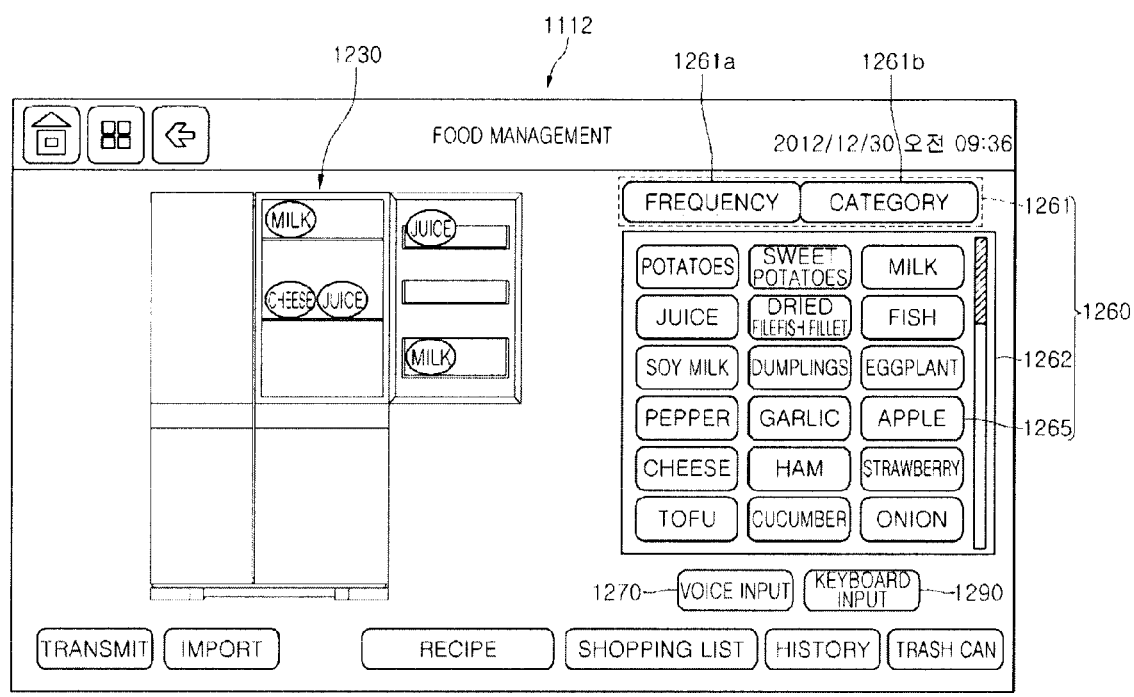
FIG. 29 is a view of a screen displayed on a display unit when the opening/closing of a sub door of a refrigerator is detected according to an embodiment of the present invention.

FIG. 29 is a view of a screen displayed on a display unit when the opening/closing of a sub door of a refrigerator is detected according to an embodiment of the present invention.

In this embodiment, while the doors 700, 800, and 840 of the refrigerator are closed, if a predetermined time elapses, the display unit 921 is in a sleep state. When the display unit 921 is in the sleep state, it is turned off.

Then, a state in which a command input is completed in the display unit 921 of the refrigerator or an additional input unit and before the display unit 921 becomes a sleep state is called a standby state. In the standby state of the display unit 921, a current display screen is displayed for a predetermined time.

Referring to FIGS. 25, 26, and 29, during the sleep state of the display unit 921, when the third detection unit 953 detects the opening of the sub door 840, the display unit 921 may display a food management screen 1112 for food management of the home bar space 805. That is, when the third detection unit 953 detects the opening of the sub door 840, the display unit 921 is turned on, and displays a food management screen 1112 instead of a main screen 1100. As another example, after the display unit 912 displays the main screen 1100, it is possible to switch into the food management screen 1112.

The food management screen 1112 may display food position information 1230. The food position information 1230 may be displayed as a refrigerator form. At this point, in relation to a refrigerator displaying the food position information 1230, when a freezer compartment door is closed and a main door of a refrigerator compartment is closed, a sub door is opened.

Additionally, the food management screen 1112 may further display the food list information 1260. At this point, the food management screen 1112 shown in FIG. 29 and the food management screen 1110 of FIG. 28 have a difference only on food position information.

Therefore, a user may input, delete, or modify food information or information necessary for food management on the food management screen 112.

According to one embodiment, while the sub door 840 is opened, since the display unit 921 directly displays the food management screen 1112, a user does not need to select the food management selection unit 1020 from a main screen and the home bar information 1215 from the screen of FIG. 28. As a result, user's convenience may be improved.

As another example, during a sleep state of the display unit 921, when the third detection unit 953 detects the closing of the sub door 840 after the sub door 840 is opened, the display unit 921 is turned on, and directly displays the food management screen 1112 instead of the main screen 1100. In another example, after the display unit 912 displays the main screen 1100, it is possible to switch into the food management screen 1112.

Moreover, during a sleep state of the display unit 921, when the first detection unit 951 detects the opening of the freezer compartment door 700 or the closing after the freezer compartment door 700 is opened, the display unit 921 is turned on, and displays the food management screen 1110 of FIG. 28.

Moreover, during a sleep state of the display unit 921, when the second detection unit 952 detects the opening of the main door 810 or the closing after the main door 810 is opened, the display unit 921 is turned on, and displays the food management screen of FIG. 4.

In another example, when the opening of a specific door (e.g., a sub door) is detected and the display unit 921 displays a specific screen, the opening of another door (e.g., a freezer compartment door, or a main door besides a sub door) may be detected before the closing of the specific door is detected. In this case, a currently-displayed specific screen in the display unit 921 switches into a screen displayed when the opening of a corresponding door is detected or the currently-displayed specific screen in the display unit 921 and the screen to be displayed are simultaneously displayed.

Then, when at least two screens are displayed on the display unit, if one door is closed, a screen corresponding to the closed door may disappear.

Furthermore, while a specific screen (e.g., the food management screen 1110 of FIG. 28) is displayed during a standby state of the display unit 921, if the opening or closing after opening of the sub door 840 is detected, the specific screen may switch into the food management screen 1112.

Furthermore, while a specific screen (e.g., the main screen of the food management screen 1112 of FIG. 29) is displayed during a standby state of the display unit 921, if the opening or closing after opening of the freezer compartment door 700 or the main door 810 is detected, the specific screen may switch into the food management screen 1110.

Furthermore, while the food management screen of FIG. 5 is displayed during a standby state of the display unit 921, if the opening or closing after opening of the freezer compartment door 700 or the main door 810 is detected, the currently-displayed specific screen may be continuously displayed.

Additionally, while the main screen 1000 is displayed during a standby state, if a specific door is opened, the main screen 1000 may switch into another screen.

In one embodiment, when the opening or closing after opening of a specific door is detected, a user may change a screen displayed on the display unit. Hereinafter, another example of a screen displayed when the opening/closing of the freezer compartment door 700 is detected will be described.

Figure 30:
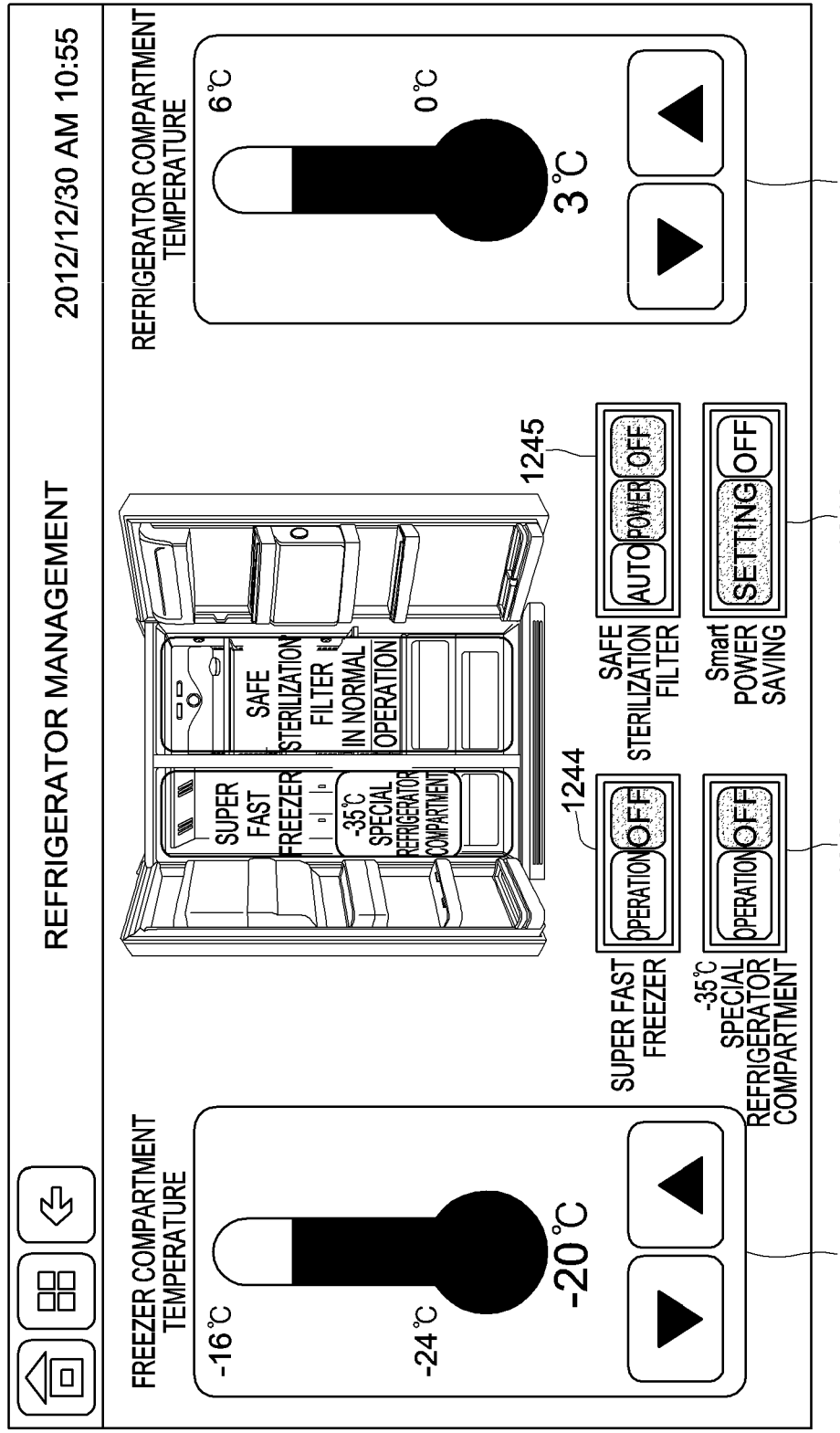
FIG. 30 is a view of a screen displayed on a display unit when the opening/closing of a refrigerator room door is detected according to an embodiment of the present invention.

FIG. 30 is a view of a screen displayed on a display unit when the opening/closing of a refrigerator compartment door is detected according to an embodiment of the present invention.

Referring to FIGS. 25, 26, and 30, during the sleep state of the display unit 921, when the first detection unit 951 detects the opening or closing after opening of the freezer compartment door 700, the display unit 921 may display a refrigerator management screen 1113 as one example of a function management screen.

The refrigerator management screen 1113 may display at least freezer compartment temperature information and refrigerator compartment temperature information.

Furthermore, the refrigerator management screen 1113 may further display a freezer compartment temperature change unit 1241 changing a freezer compartment temperature, a refrigerator compartment temperature change unit 1242 changing a refrigerator compartment temperature, and a sleep function selection unit 1246 selecting one of a sleep function and a general function.

Furthermore, the refrigerator management screen 1113 may further display a selection unit 1243 selecting an operation of a specific cooling compartment, a selection unit 1244 selecting express freezing, and a selection unit 1245 selecting an operation of a filter.

In the above embodiments, when the opening/closing of a refrigerator compartment door is detected, the refrigerator management screen of FIG. 30 is displayed. When the opening/closing of a main door or sub door of a refrigerator compartment door is detected, the refrigerator management screen of FIG. 30 may be displayed.

In one embodiment, when the opening/closing of a specific door is detected during a sleep state of the display unit 921, the display unit 921 may be turned on and may display at least one of function management screens besides the main screen 1000. For example, at least one of function management screens displayed on the display unit 921 (e.g., a preference setting screen, a food management screen, a recipe management screen, a shopping list screen, a refrigerator management screen, a schedule management screen, and a memo management screen) may be displayed, and a function management screen displayed on the display unit 921 is not limited to the above embodiments.

At this point, the function management screen of this embodiment includes a screen displayed when a specific selection unit is selected from the main screen 1000 and a detailed function management screen displayed when a selection unit is selected from a function management screen.

Additionally, as mentioned above, when a detection unit detects the opening or closing after opening of a specific door, the display unit displays a function management screen. Unlike this, when the opening of a specific door is detected, a function management screen is displayed, and when the closing of a specific door is detected, a currently-displayed function management screen may switch into another function management screen. For example, when the opening of a freezer compartment door is detected, the display unit displays a food management screen, and when the closing of a freezer compartment door is detected, the display unit displays a refrigerator management screen.

Additionally, although a refrigerator is described as one example of an electric product, the present disclosure may be applied to an electric product including a storage compartment storing consumable and a door opening/closing the storage compartment such as a washing machine, a drier, or a cooking appliance.

At this point, the consumable may be products or materials used or processed during an operation of an electric product. For example, the consumable may be washed fabric in a washing machine, cooked food in a cooking appliance, detergent or fabric softener for washing fabric in a washing machine, condiment for cooking food, or food in a refrigerator.

A screen displayed on a display unit of an electric product may include a main screen and a function management screen, and when the opening or closing of a door is detected, a function management screen may be directly displayed on the display unit.

Also, the method of displaying a screen on a display unit described with reference to FIGS. 26 to 30 may be identically applied to the display unit shown in FIG. 2.

Although embodiments have been described with reference to a number of illustrative embodiments thereof, it should be understood that numerous other modifications and embodiments can be devised by those skilled in the art that will fall within the spirit and scope of the principles of this disclosure. More particularly, variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art.

What is claimed is:

1. An electric product comprising:
a recognizer to obtain information about a food item to be added to a storage compartment;
a display to display information about a food item stored in the storage compartment;
a memory to store the information about the food item stored in the storage compartment; and
a controller to control the display,
wherein when the recognizer obtains information about the food item to be added, the controller stores the information about the food item to be added in the memory, and
wherein the display displays a food position information screen with a refrigerator compartment region and a freezer compartment region, the information about the food added to the memory is positioned in one of the refrigerator compartment region and the freezer compartment region.

2. The electric product of claim 1, wherein the controller displays information about the food item pre-stored in the storage compartment and information about the added food item for comparison.

3. The electric product of claim 2, wherein at least one of a color, a letter size, an icon size, an icon form, or an icon color of the information about the added food item is displayed different from that of the food item pre-stored in the storage compartment.

4. The electric product of claim 2, wherein the displayed information about the added food item flashes.

5. The electric product of claim 4, wherein the displayed information about the added food item stops flashing after a predetermined time elapses.

6. The electric product of claim 1, wherein the position of the added food item is manually changed.

7. The electric product of claim 6, wherein when the position of the added food item is changed, the controller identically displays information related to an added food item and information related to the pre-stored food item.

8. The electric product of claim 1, wherein the recognizer is a camera, and the camera obtains information about the food to be added from a captured image capturing a purchase receipt of a product.

9. An electric product, comprising:
a camera to obtain information about a food item to be added to a storage compartment from a captured image capturing a purchase receipt of a product;
a display to display information about a food item stored in the storage compartment;
a memory to store the information about the food item stored in the storage compartment; and
a controller to control the display,
wherein when the camera obtains information about the food item to be added, the controller stores the information about the food item to be added in the memory, and
wherein the controller:
extracts a recognition target area from a captured image and displays the extracted recognition target area on a display;
determines a recognition target area where a recognition is performed from the displayed recognition target area; and
recognizes information in the determined recognition target area and displays a recognition result.

10. The electric product of claim 9, wherein the controller separately displays the recognition target area and a non-recognition target area on the display.

11. The electric product of claim 9, wherein when a plurality of recognition target areas are extracted, the controller separately displays the plurality of recognition target areas on the display.

12. The electric product of claim 11, wherein when the recognition target area is determined, whether each of the plurality of recognition target areas performs a recognition is determined separately.

13. The electric product of claim 11, wherein an area where a recognition is performed is selectable from among the plurality of recognition target areas displayed on the display.

14. The electric product of claim 11, wherein an area where no recognition is performed is selectable from among the plurality of recognition target areas displayed on the display.

15. The electric product of claim 9, wherein information in a recognition target area displayed on the display comprises a product name or a product code.

16. The electric product of claim 9, wherein when no recognition target area is extracted from a captured image, the controller displays information for an image reacquisition request on the display.

17. The electric product of claim 9, wherein when the recognized result is displayed, the controller displays a category that the recognized information belongs to on the display.

18. The electric product of claim 9, wherein when the recognized result is displayed, the controller displays the recognized information itself on the display.

19. The electric product of claim 9, wherein when the recognized result is displayed, the controller displays the number of recognized information on the display.

20. The electric product of claim 9, wherein the controller extracts the recognition target area on the basis of at least one of a product number, a product name, or a product code in the captured image.

21. The electric product of claim 1, further comprising:
a door that opens or closes the storage compartment; and
a detector that detects an opening or closing of the door,
wherein a screen displayed on the display comprises a main screen and a function management screen displayed when an external command is inputted while the main screen is displayed, and when the detector detects the opening or closing of the door, the controller displays the function management screen on the display.

22. The electric product of claim 21, wherein the display is in an off state before the detector detects the opening or closing of the door, and when the detector detects the opening or closing of the door, the controller turns on the display, and then displays the function management screen on the display.

23. The electric product of claim 22, wherein the door is provided in plurality, and a function management screen displayed when the opening or closing of one door of a plurality of doors is detected is different from a function management screen displayed when the opening or closing of another door is detected.

24. The electric product of claim 22, wherein the door is provided in plurality, and when the closing of one door of a plurality of doors is detected while the display displays a function management screen, if the opening or closing of another door among the plurality of doors is detected, the controller changes the function management screen currently displayed on the display to display another function management screen.

25. The electric product of claim 22, wherein the door is provided in plurality, and when the opening of one door of a plurality of doors is detected while the display displays a function management screen, if the opening or closing of another door among the plurality of doors is detected, the controller changes the function management screen currently displayed on the display to display another function management screen, or further displays another function management screen in addition to the currently displayed function management screen.

26. The electric product of claim 21, wherein a function management screen displayed on the display is provided in plurality, and when the opening or closing of the door is detected while the display displays the main screen, the controller switches the main screen to display one of the plurality of function management screens.

27. The electric product of claim 21, wherein a function management screen displayed on the display is provided in plurality, and when the opening or closing of the door is detected while the display displays one of the plurality of function management screens, the controller switches the one function management screen to display another function management screen.

28. The electric product of claim 21, wherein when the opening or closing of the door is detected while the display displays a function management screen, if a function management screen that is to be displayed when the door is opened or closed is identical to the function management screen currently displayed on the display, the controller continuously displays the function management screen currently displayed on the display.

29. The electric product of claim 21, wherein when the detector detects the opening or closing of the door, a function management screen to be displayed on the display is changeable.

30. The electric product of claim 21, wherein when the opening of the door is detected, a function management screen displayed on the display is different from a function management screen displayed on the display when the closing of the door is detected.

* * * * *